(12) United States Patent
Wang

(10) Patent No.: US 11,796,893 B2
(45) Date of Patent: Oct. 24, 2023

(54) COMPACT CAMERA MODULE AND TERMINAL DEVICE

(71) Applicant: HUAWEI TECHNOLOGIES CO., LTD., Guangdong (CN)

(72) Inventor: Qingping Wang, Shenzhen (CN)

(73) Assignee: HUAWEI TECHNOLOGIES CO., LTD., Shenzhen (CN)

(\*) Notice: Subject to any disclaimer, the term of this patent is extended or adjusted under 35 U.S.C. 154(b) by 94 days.

(21) Appl. No.: 17/517,208

(22) Filed: Nov. 2, 2021

(65) Prior Publication Data

US 2022/0057693 A1 Feb. 24, 2022

Related U.S. Application Data

(63) Continuation of application No. PCT/CN2020/083844, filed on Apr. 8, 2020.

(30) Foreign Application Priority Data

May 5, 2019 (CN) .......................... 201910367026.2
Mar. 24, 2020 (CN) .......................... 202010214891.6

(51) Int. Cl.
*G03B 13/34* (2021.01)
*G03B 17/17* (2021.01)
(Continued)

(52) U.S. Cl.
CPC ............. *G03B 13/34* (2013.01); *G03B 17/17* (2013.01); *H04N 23/55* (2023.01); *H04N 23/67* (2023.01); *H04N 23/69* (2023.01)

(58) Field of Classification Search
CPC ........ G03B 13/34; G03B 17/17; H04N 23/55; H04N 23/67; H04N 23/69; H04N 23/45;
(Continued)

(56) References Cited

U.S. PATENT DOCUMENTS

2004/0141065 A1\* 7/2004 Hara .................... H04N 23/687
348/208.11
2009/0122406 A1 5/2009 Rouvinen et al.
(Continued)

FOREIGN PATENT DOCUMENTS

CN 1885081 A 12/2006
CN 101038366 A 9/2007
(Continued)

*Primary Examiner* — Padma Haliyur
(74) *Attorney, Agent, or Firm* — HUAWEI TECHNOLOGIES CO., LTD.

(57) ABSTRACT

This application provides a compact camera module, which includes a first actuator, an optical lens component, a ray adjustment component, and an image sensor. The ray adjustment component and the image sensor are sequentially disposed along a direction of a principal optical axis of the optical lens component. The optical lens component is configured to receive rays from a photographed object. The ray adjustment component is configured to fold an optical path of the rays propagated from the optical lens component. The first actuator is configured to drive the ray adjustment component to move, so that the rays whose optical path is folded are focused on the image sensor.

19 Claims, 22 Drawing Sheets

(51) Int. Cl.
*H04N 23/55* (2023.01)
*H04N 23/67* (2023.01)
*H04N 23/69* (2023.01)

(58) Field of Classification Search
CPC ........ H04N 23/57; H04N 23/58; H04N 23/54; G02B 5/04; G02B 13/0065; G02B 17/023; G02B 5/08
See application file for complete search history.

(56) References Cited

U.S. PATENT DOCUMENTS

| | | | |
|---|---|---|---|
| 2010/0002127 A1 | 1/2010 | Ishii | |
| 2010/0007771 A1 | 1/2010 | Hwang et al. | |
| 2014/0232846 A1 | 8/2014 | Tanaka | |
| 2015/0168681 A1 | 6/2015 | Han et al. | |
| 2015/0373252 A1 | 12/2015 | Georgiev | |
| 2016/0044247 A1* | 2/2016 | Shabtay | H04N 23/45 348/240.3 |
| 2016/0223885 A1 | 8/2016 | Song et al. | |
| 2018/0295292 A1* | 10/2018 | Lee | H04N 23/67 |
| 2018/0324349 A1 | 11/2018 | Kim | |

FOREIGN PATENT DOCUMENTS

| | | |
|---|---|---|
| CN | 101042462 A | 9/2007 |
| CN | 103676405 A | 3/2014 |
| CN | 204119330 U | 1/2015 |
| CN | 104898352 A | 9/2015 |
| CN | 104937475 A | 9/2015 |
| CN | 105959525 A | 9/2016 |
| CN | 107241549 A | 10/2017 |
| CN | 107317896 A | 11/2017 |
| CN | 107370934 A | 11/2017 |
| CN | 107490845 A | 12/2017 |
| CN | 107896298 A | 4/2018 |
| CN | 207691912 U | 8/2018 |
| CN | 208174825 U | 11/2018 |
| CN | 110515189 A | 11/2019 |
| CN | 110646932 A | 1/2020 |
| CN | 110888216 A | 3/2020 |
| CN | 110913096 A | 3/2020 |
| EP | 1748310 A2 | 1/2007 |
| EP | 1788419 A1 | 5/2007 |
| JP | S4866849 A | 9/1973 |
| JP | S51152746 U | 12/1976 |
| JP | H0253544 A | 2/1990 |
| JP | H06160545 A | 6/1994 |
| JP | H10230254 A | 9/1998 |
| JP | H11320165 A | 11/1999 |
| JP | 2001257914 A | 9/2001 |
| JP | 2004013169 A | 1/2004 |
| JP | 2007139944 A | 6/2007 |
| JP | 2009512886 A | 3/2009 |
| JP | 2009526257 A | 7/2009 |
| JP | 2016142947 A | 8/2016 |
| JP | 2017520025 A | 7/2017 |
| KR | 20160095457 A | 8/2016 |
| KR | 20170020803 A | 2/2017 |
| TW | 200641392 A | 12/2006 |
| WO | 2012165575 A1 | 12/2012 |
| WO | 2015134173 A1 | 9/2015 |
| WO | 2016194612 A1 | 12/2016 |

* cited by examiner

COMPACT CAMERA MODULE AND TERMINAL DEVICE

CROSS-REFERENCE TO RELATED APPLICATIONS

This application is a continuation of International Application No. PCT/CN2020/083844, filed on Apr. 8, 2020, which claims priority to Chinese Patent Application No. 201910367026.2, filed on May 5, 2019 and Chinese Patent Application No. 202010214891.6, filed on Mar. 24, 2020. All of the aforementioned patent applications are hereby incorporated by reference in their entireties.

TECHNICAL FIELD

This application relates to the field of compact camera module technologies, and in particular, to a compact camera module, a terminal device, an imaging method, and an imaging apparatus.

BACKGROUND

With the development of technologies, more functions, for example, a photographing function, are integrated into electronic devices. In addition, with wide use of electronic devices, users have an increasingly high requirement on the photographing function. For example, the users require a higher-quality image and a higher optical zoom ratio. Currently, a structure of a compact camera module disposed in an electronic device is used to implement a higher optical zoom ratio, as shown in FIG. 1 or FIG. 2. The structure shown in FIG. 1 is a vertical architecture, a motor is used to drive an entire optical lens component for focusing, and an optical path for imaging is short. Consequently, the compact camera module cannot implement a high optical zoom ratio. In the structure shown in FIG. 2, a motor is also used to drive an imaging lens component for focusing, a long optical path for imaging is required, and therefore a size of the compact camera module is large. Consequently, a high optical zoom ratio cannot be implemented because space of the electronic device is limited.

SUMMARY

This application provides a compact camera module, a terminal device, an imaging method, and an imaging apparatus, to implement a high optical zoom ratio on a small-sized compact camera module.

According to a first aspect, this application provides a compact camera module. The compact camera module may include a first actuator, an optical lens component, a ray adjustment component, and an image sensor. The ray adjustment component and the image sensor are sequentially disposed along a direction of a principal optical axis of the optical lens component. The optical lens component is configured to receive rays from a photographed object. The ray adjustment component is configured to fold an optical path of the rays propagated from the optical lens component. The first actuator is configured to drive the ray adjustment component to move, so that the rays whose optical path is folded are focused on the image sensor. The image sensor is configured to perform imaging based on the focused rays.

According to an embodiment, the ray adjustment component folds the optical path of the rays propagated from the optical lens component. This helps shorten an optical path for imaging. When a physical focal length of the optical lens component is given, the ray adjustment component folds the optical path of the rays, so that an image distance can meet an imaging condition, and an optical path for imaging can be shortened. In this way, a size of the compact camera module can be reduced. It may also be understood that, when the compact camera module is located in limited space (or the size of the compact camera module is limited), an optical lens component with a long physical focal length may be used when the compact camera module in this application is used, so that a high optical zoom ratio can be implemented.

In an embodiment, the ray adjustment component includes M first reflection surfaces and M second reflection surfaces. The M first reflection surfaces are disposed one-to-one opposite to the M second reflection surfaces. The M first reflection surfaces are sequentially connected, an included angle between any two adjacent first reflection surfaces is $\theta_1$, and $\theta_1$ is greater than 0 degrees and less than 180 degrees. The M second reflection surfaces are sequentially connected, an included angle between any two adjacent second reflection surfaces is $\theta_2$, and $\theta_2$ is greater than 0 degrees and less than 180 degrees. M is an integer greater than or equal to 2. A first reflection surface closest to the optical lens component is configured to receive and reflect the rays from the optical lens component. A first reflection surface closest to the image sensor is configured to reflect, to the image sensor, the rays whose optical path is folded.

The optical path of the rays propagated from the optical lens component in the ray adjustment component is as follows: the first reflection surface closest to the optical lens component receives the rays from the optical lens component, and reflects the received rays to a second reflection surface disposed opposite to the first reflection surface (namely, the first reflection surface closest to the optical lens component); the second reflection surface reflects the received rays to a second reflection surface that is closest to the second reflection surface and that is sequentially connected to the second reflection surface; the closest second reflection surface reflects the received rays to a first reflection surface that is disposed opposite to the second reflection surface (namely, the closest second reflection surface), and reflection is performed by analogy until the rays are reflected to the first reflection surface closest to the image sensor. Rays received by the first reflection surface closest to the image sensor are the rays whose optical path is folded, and the rays whose optical path is folded are propagated along the direction of the principal optical axis. The first reflection surface closest to the image sensor reflects, to the image sensor, the rays whose optical path is folded.

The ray adjustment component may be configured to fold, 2M times, the optical path of the rays propagated from the optical lens component.

In an embodiment, $\theta_1$ is greater than or equal to 60 degrees and less than or equal to 120 degrees, that is, $60° \leq \theta_1 \leq 120°$; and $\theta_2$ is greater than or equal to 60 degrees and less than or equal to 120 degrees, that is, $60° \leq \theta_2 \leq 120°$. For example, $\theta_1$ may be 30 degrees, 45 degrees, 60 degrees, 90 degrees, 120 degrees, 135 degrees, or 150 degrees; and $\theta_2$ may be 30 degrees, 45 degrees, 60 degrees, 90 degrees, 120 degrees, 135 degrees, or 150 degrees.

In an embodiment, a layered structure constituted by the M first reflection surfaces does not overlap a layered structure constituted by the M second reflection surfaces. For example, the M first reflection surfaces are located at a first layer, the M second reflection surfaces are located at a second layer, and the first layer and the second layer do not overlap each other.

The M first reflection surfaces and the M second reflection surfaces are disposed at two layers that do not overlap each other, so that the optical path of the rays propagated from the optical lens component can be folded between the two layers that do not overlap each other.

In an embodiment, an $i^{th}$ first reflection surface is parallel to an $i^{th}$ second reflection surface, the $i^{th}$ first reflection surface is disposed opposite to the $i^{th}$ second reflection surface, the $i^{th}$ first reflection surface is one of the M first reflection surfaces, and the $i^{th}$ second reflection surface is one of the M second reflection surfaces.

The $i^{th}$ first reflection surface and the $i^{th}$ second reflection surface are disposed in parallel, to facilitate assembly of the compact camera module. If the first reflection surface is not parallel to the opposite disposed second reflection surface, when the compact camera module is horizontally placed to photograph an image, an image formed on the image sensor may be tilted.

In an embodiment, the M first reflection surfaces include reflection surfaces of M/2 sequentially connected L-shaped mirrors, where any L-shaped mirror includes two reflection surfaces; or the M first reflection surfaces include reflection surfaces of M sequentially connected mirrors; or the M first reflection surfaces include reflection surfaces of M/2 sequentially connected right-angle prisms; or the M first reflection surfaces include reflection surfaces of P mirrors and Q right-angle prisms that are sequentially connected, where any right-angle prism includes two reflection surfaces, P+Q=M, and both P and Q are positive integers; or the M first reflection surfaces include reflection surfaces of m mirrors and n L-shaped mirrors that are sequentially connected, where m+2n=M, and both m and n are positive integers; or the M first reflection surfaces include reflection surfaces of p right-angle prisms and q L-shaped mirrors that are sequentially connected, where 2p+2q=M, and both p and q are positive integers; or the M first reflection surfaces include reflection surfaces of k right-angle prisms, t L-shaped mirrors, and h mirrors that are sequentially connected, where 2k+2t+h=M, and k, t, and h are all positive integers.

In an embodiment, the M second reflection surfaces include reflection surfaces of M/2 sequentially connected L-shaped mirrors, where any L-shaped mirror includes two reflection surfaces; or the M second reflection surfaces include reflection surfaces of M sequentially connected mirrors; or the M second reflection surfaces include reflection surfaces of M/2 sequentially connected right-angle prisms; or the M second reflection surfaces include u mirrors and v L-shaped mirrors that are sequentially connected, where u+2v=M, and both u and v are positive integers; or the M second reflection surfaces include reflection surfaces of K mirrors and L right-angle prisms that are sequentially connected, where any right-angle prism includes two reflection surfaces, K+2L=M, and both K and L are positive integers; or the M second reflection surfaces include reflection surfaces of l right-angle prisms and s L-shaped mirrors that are sequentially connected, where 2l+2s=M, and both l and s are positive integers; or the M second reflection surfaces include reflection surfaces of j right-angle prisms, w L-shaped mirrors, and z mirrors that are sequentially connected, where 2j+2w+z=M, and j, w, and z are all positive integers.

When M=2, the two first reflection surfaces are two mutually perpendicular reflection surfaces of one L-shaped mirror, and the two second reflection surfaces are two mutually perpendicular reflection surfaces of one right-angle prism.

Further, optionally, two reflection surfaces of an L-shaped mirror are perpendicular to each other.

In an embodiment, projections of lengths of the two reflection surfaces of the L-shaped mirror are different in the direction of the principal optical axis. In the two reflection surfaces of the L-shaped mirror, one reflection surface is closer to the optical lens component and farther away from the image sensor, and the other reflection surface is farther away from the optical lens component and closer to the image sensor.

In an embodiment, a length of the reflection surface that is closer to the optical lens component and that is farther away from the image sensor is greater than a length of the reflection surface that is farther away from the optical lens component and that is closer to the image sensor; or a length of the reflection surface that is closer to the optical lens component and that is farther away from the image sensor is less than a length of the reflection surface that is farther away from the optical lens component and that is closer to the image sensor; a length of the reflection surface that is closer to the optical lens component and that is farther away from the image sensor is equal to a length of the reflection surface that is farther away from the optical lens component and that is closer to the image sensor.

In an embodiment, the first actuator is configured to drive the M first reflection surfaces to move along a first direction, and/or drive the M second reflection surfaces to move along a second direction. The first direction is opposite to the second direction, and both the first direction and the second direction are directions perpendicular to the principal optical axis.

The first actuator drives the M first reflection surfaces to move along the first direction, and/or drives the M second reflection surfaces to move along the second direction, so that rays at different object distances can be focused. This can ensure that a clear image is formed on the image sensor. In addition, the first actuator drives the M first reflection surfaces and/or the M second reflection surfaces of the ray adjustment component to move to implement focusing, without a need to move the optical lens component. Therefore, the optical lens component does not need to be coupled to the first actuator.

In an embodiment, the first actuator is configured to drive the M first reflection surfaces to move along a direction perpendicular to the principal optical axis.

The first actuator drives the M first reflection surfaces to move along the direction perpendicular to the principal optical axis, so that rays at different object distances can be focused. This can ensure that a clear image is formed on the image sensor. In addition, driving only the M first reflection surfaces to move helps reduce power consumption of the first actuator. Particularly, when the M first reflection surfaces are reflection surfaces of the M/2 sequentially connected L-shaped mirrors, where any one of the M/2 L-shaped mirrors includes two reflection surfaces, and the M second reflection surfaces are reflection surfaces of the M/2 sequentially connected right-angle prisms, power consumption of the first actuator is significantly reduced.

Further, in an embodiment, the first actuator is further configured to drive the M first reflection surfaces and/or the M second reflection surfaces to move along a third direction, to perform optical image stabilization on the rays from the optical lens component, where the third direction is a direction parallel to the principal optical axis.

The first actuator drives the M first reflection surfaces and/or the M second reflection surfaces to move along the third direction. This can perform optical image stabilization on the rays in a specific direction (namely, the third direction) and increase an anti-shake angle while the ray adjustment component folds the optical path of the rays propagated from the optical lens component.

The first actuator drives the M first reflection surfaces and/or the M second reflection surfaces to move along the third direction by a distance less than a preset distance.

Further, in an embodiment, the preset distance is a smallest value in a first projection distance set and a second projection distance set. The first projection distance set includes projection distances of lengths of all the M first reflection surfaces in the direction of the principal optical axis. The second projection distance set includes projection distances of lengths of all the M second reflection surfaces in the direction of the principal optical axis.

In an embodiment, a range of the preset distance is (0, 2.5] (unit: millimeter (mm)).

In an embodiment, the compact camera module further includes an optical image stabilization component. The optical lens component is located between the optical image stabilization component and the ray adjustment component. The optical image stabilization component includes a second actuator and a third reflection surface. The third reflection surface is configured to receive rays from the photographed object. The second actuator is configured to drive the third reflection surface to rotate, to perform optical image stabilization on the rays from the photographed object, and emit rays obtained through optical image stabilization into the optical lens component.

The optical image stabilization component can implement optical image stabilization for the compact camera module, so that the compact camera module can output a more stable image.

In an embodiment, an included angle between the third reflection surface and the principal optical axis is $\theta_3$, where $\theta_3$ is greater than 0 degrees and less than 90 degrees. Further, optionally, $\theta_3$ is greater than or equal to 30 degrees and less than or equal to 60 degrees. For example, $\theta_3$ may be 30 degrees, 45 degrees, or 60 degrees.

In an embodiment, the third reflection surface may be a reflection surface of a right-angle prism (for example, a hypotenuse surface of an isosceles right-angle prism) or a reflection surface of a mirror.

In an embodiment, the ray adjustment component includes one L-shaped mirror and one right-angle prism. The L-shaped mirror includes an eleventh reflection surface and a twelfth reflection surface that are perpendicular to each other. The right-angle prism includes a thirteenth reflection surface and a fourteenth reflection surface that are perpendicular to each other. The eleventh reflection surface and the thirteenth reflection surface are disposed opposite and parallel to each other. The twelfth reflection surface and the fourteenth reflection surface are disposed opposite and parallel to each other. In this way, the rays from the optical lens component are reflected to the image sensor after being sequentially reflected by the eleventh reflection surface, the thirteenth reflection surface, the fourteenth reflection surface, and the twelfth reflection surface.

It should be noted that the eleventh reflection surface and the twelfth reflection surface may be understood as two first reflection surfaces described above, and the thirteenth reflection surface and the fourteenth reflection surface may be understood as two second reflection surfaces described above. In other words, both the eleventh reflection surface and the twelfth reflection surface each are a first reflection surface, and both the thirteenth reflection surface and the fourteenth reflection surface each are a second reflection surface.

Further, in an embodiment, an included angle between the eleventh reflection surface of the L-shaped mirror and the principal optical axis is 45 degrees, and an included angle between the twelfth reflection surface of the L-shaped mirror and the principal optical axis is 45 degrees.

Further, in an embodiment, an included angle between the thirteenth reflection surface of the right-angle prism and the principal optical axis is 45 degrees, and an included angle between the fourteenth reflection surface of the right-angle prism and the principal optical axis is 45 degrees.

Further, in an embodiment, when the rays from the optical lens component enter the eleventh reflection surface of the L-shaped mirror at an incident angle of 45 degrees, the rays reflected to the image sensor by the twelfth reflection surface of the L-shaped mirror are parallel to the direction of the principal optical axis.

Further, in an embodiment, an opening direction of the L-shaped mirror is the same as an opening direction of a right angle of the right-angle prism.

In an embodiment, the first actuator is configured to drive the L-shaped mirror to move along a first direction, and/or drive the right-angle prism to move along a second direction. The first direction is opposite to the second direction, and both the first direction and the second direction are directions perpendicular to the principal optical axis.

In an embodiment, the first actuator is configured to drive the L-shaped mirror to move along the direction perpendicular to the principal optical axis.

In a possible implementation, the first actuator is further configured to drive the L-shaped mirror and/or the right-angle prism to move along a third direction, to perform optical image stabilization on the rays from the optical lens component. The third direction is a direction parallel to the principal optical axis.

In an embodiment, the first actuator is configured to drive the L-shaped mirror and/or the right-angle prism to move along the third direction by a distance less than a preset distance.

According to a second aspect, this application provides a compact camera module. The compact camera module may include a first actuator, an optical lens component, a ray adjustment component, and an image sensor. The ray adjustment component and the image sensor are sequentially disposed along a direction of a principal optical axis of the optical lens component. The optical lens component is configured to receive rays from a photographed object. The ray adjustment component is configured to fold an optical path of the rays propagated from the optical lens component. The first actuator is configured to drive the ray adjustment component or the optical lens component to move, so that the rays whose optical path is folded are focused on the image sensor. The image sensor is configured to perform imaging based on the focused rays.

According to an embodiment, the ray adjustment component folds the optical path of the rays propagated from the optical lens component. This helps shorten an optical path for imaging. When a physical focal length of the optical lens component is given, the ray adjustment component folds the optical path of the rays, so that an image distance can meet an imaging condition, and the optical path for imaging can be shortened. In this way, a size of the compact camera module can be reduced. It may also be understood that, when the compact camera module is located in limited space, an optical lens component with a long physical focal length may be used when the compact camera module in this application is used, so that a high optical zoom ratio can be implemented.

In an embodiment, the first actuator may be configured to drive the optical lens component to move along a direction parallel to the principal optical axis.

The first actuator drives the optical lens component to move along the direction parallel to the principal optical axis, so that rays at different object distances can be focused. This can ensure that a clear image is formed on the image sensor.

It should be understood that, in the second aspect, the first actuator may drive the optical lens component to move, so that the rays whose optical path is folded are focused on the image sensor; or the first actuator may drive the ray adjustment component to move, so that the rays whose optical path is folded are focused on the image sensor. For a specific implementation, refer to related descriptions in any one of the possible implementations of the first aspect. Details are not described herein again. For specific implementations of the optical lens component, the ray adjustment component, and the image sensor, refer to the descriptions in any one of the implementations of the first aspect. Details are not described herein again.

According to a third aspect, this application provides a terminal device. The terminal device may include a first camera, a memory, and a processor. The first camera includes the compact camera module according to any one of the first aspect or the implementations of the first aspect. The memory is configured to store a program or instructions. The processor is configured to invoke the program or the instructions to control the first camera to obtain the first image.

In an embodiment, the terminal device further includes a wide-angle camera.

In an embodiment, the first camera is a fixed-focus camera, a magnification of the first camera is A1, and a value range of A1 is [8, 12]. In this way, the terminal device can implement a high optical zoom ratio.

In an embodiment, the terminal device further includes a second camera, the second camera is a fixed-focus camera, a magnification of the second camera is A2, and A2 is greater than 1 and less than A1.

According to a fourth aspect, this application provides an imaging method. The method may be applied to a terminal device. The terminal device includes a first camera, the first camera includes a ray adjustment component, and the ray adjustment component is configured to fold an optical path of rays obtained by the first camera. The method includes: obtaining a zoom ratio; when the zoom ratio is greater than a zoom ratio threshold, obtaining a preview image by using the first camera; determining a target focusing position of the first camera based on the preview image; and driving the ray adjustment component to move for focusing based on the target focusing position.

According to an embodiment, the ray adjustment component folds the optical path of the rays propagated from an optical lens component, so that an optical path for imaging can be shortened, and a size of a compact camera module can be reduced. When the compact camera module is integrated into a terminal device with limited space, an optical lens component with a long physical focal length may be used, so that a high optical zoom ratio can be implemented. Further, the ray adjustment component is driven to move for focusing based on the zoom ratio, so that a clear first image can be formed.

In an embodiment, a value range of the zoom ratio threshold is [5, 10).

In an embodiment, the target focusing position may be determined based on a central area of the preview image; or a focusing operation performed by a user on the preview image is received, and a focusing position in response to the focusing operation is determined as the target focusing position.

In an embodiment, a target position of the ray adjustment component is determined based on the target focusing position, and the ray adjustment component is driven to move based on the target position.

The following provides examples of two implementations of driving the ray adjustment component to move for focusing. Implementation 1: Drive M first reflection surfaces to move along a first direction, and/or drive M second reflection surfaces to move along a second direction, to move to the target focusing position, where the first direction is opposite to the second direction, and both the first direction and the second direction are directions perpendicular to a principal optical axis. Implementation 2: Drive the M first reflection surfaces to move along a direction perpendicular to the principal optical axis, and move to the target focusing position.

In an embodiment, the first camera is a fixed-focus camera, a magnification of the first camera is A1, and a value range of A1 is [8, 12].

In an embodiment, the terminal device further includes a second camera, and the second camera is a fixed-focus camera. When the zoom ratio is greater than 1 and less than or equal to the zoom ratio threshold, the second camera may obtain a second image. A magnification of the second camera is A2, and A2 is greater than 1 and less than A1.

In an embodiment, the terminal device further includes a wide-angle camera. When the zoom ratio is greater than 0 and less than 1, the wide-angle camera obtains a third image.

In an embodiment, the terminal device further includes an optical lens component and an image sensor. The ray adjustment component and the image sensor are sequentially disposed along a direction of the principal optical axis of the optical lens component.

In an embodiment, the ray adjustment component includes the M first reflection surfaces and the M second reflection surfaces. The M first reflection surfaces are sequentially connected, an included angle between any two adjacent first reflection surfaces is $\theta_1$, and $\theta_1$ is greater than 0 degrees and less than 180 degrees. The M second reflection surfaces are sequentially connected, an included angle between any two adjacent second reflection surfaces is $\theta_2$, and $\theta_2$ is greater than 0 degrees and less than 180 degrees. The M first reflection surfaces are disposed one-to-one opposite to the M second reflection surfaces. M is an integer greater than or equal to 2. A first reflection surface closest to the optical lens component is configured to receive and reflect the rays from the optical lens component. A first reflection surface closest to the image sensor is configured to reflect, to the image sensor, the rays whose optical path is folded.

In an embodiment, a first layered structure constituted by the M first reflection surfaces does not overlap a second layered structure constituted by the M second reflection surfaces.

In an embodiment, an $i^{th}$ first reflection surface is parallel to an $i^{th}$ second reflection surface, the $i^{th}$ first reflection surface is disposed opposite to the $i^{th}$ second reflection surface, the $i^{th}$ first reflection surface is one of the M first reflection surfaces, and the $i^{th}$ second reflection surface is one of the M second reflection surfaces.

In an embodiment, the ray adjustment component is configured to fold, 2M times, the optical path of the rays propagated from the optical lens component.

In an embodiment, the M first reflection surfaces may include reflection surfaces of M/2 sequentially connected L-shaped mirrors, where any L-shaped mirror includes two reflection surfaces; or the M first reflection surfaces include reflection surfaces of M sequentially connected mirrors; or the M first reflection surfaces include reflection surfaces of M/2 sequentially connected right-angle prisms; or the M first reflection surfaces include reflection surfaces of P mirrors and Q right-angle prisms that are sequentially connected, where any right-angle prism includes two reflection surfaces, P+2Q=M, and both P and Q are positive integers.

In an embodiment, the M second reflection surfaces include reflection surfaces of M/2 sequentially connected L-shaped mirrors, where any L-shaped mirror includes two reflection surfaces; or the M second reflection surfaces include reflection surfaces of M sequentially connected mirrors; or the M second reflection surfaces include reflection surfaces of M/2 sequentially connected right-angle prisms; or the M second reflection surfaces include reflection surfaces of K mirrors and L right-angle prisms that are sequentially connected, where any right-angle prism includes two reflection surfaces, K+2L=M, and both K and L are positive integers.

In an embodiment, when M=2, the two first reflection surfaces are two mutually perpendicular reflection surfaces of one L-shaped mirror, and the two second reflection surfaces are two mutually perpendicular reflection surfaces of one right-angle prism.

To further perform optical image stabilization on the compact camera module, in an embodiment, the M first reflection surfaces and/or the M second reflection surfaces may be driven to move along a third direction, to perform optical image stabilization on the rays from the optical lens component. The third direction is parallel to the direction of the principal optical axis.

In an embodiment, the ray adjustment component includes one L-shaped mirror and one right-angle prism. The L-shaped mirror includes an eleventh reflection surface and a twelfth reflection surface that are perpendicular to each other. The right-angle prism includes a thirteenth reflection surface and a fourteenth reflection surface that are perpendicular to each other. The eleventh reflection surface and the thirteenth reflection surface are disposed opposite and parallel to each other. The twelfth reflection surface and the fourteenth reflection surface are disposed opposite and parallel to each other. In this way, the rays from the optical lens component are reflected to the image sensor after being sequentially reflected by the eleventh reflection surface, the thirteenth reflection surface, the fourteenth reflection surface, and the twelfth reflection surface.

In an embodiment, an included angle between the eleventh reflection surface of the L-shaped mirror and the principal optical axis is 45 degrees, and an included angle between the twelfth reflection surface of the L-shaped mirror and the principal optical axis is 45 degrees.

In an embodiment, an included angle between the thirteenth reflection surface of the right-angle prism and the principal optical axis is 45 degrees, and an included angle between the fourteenth reflection surface of the right-angle prism and the principal optical axis is 45 degrees.

In an embodiment, when the rays from the optical lens component enter the eleventh reflection surface of the L-shaped mirror at an incident angle of 45 degrees, the rays reflected to the image sensor by the twelfth reflection surface of the L-shaped mirror are parallel to the direction of the principal optical axis.

In an embodiment, an opening direction of the L-shaped mirror is the same as an opening direction of a right angle of the right-angle prism.

In an embodiment, the L-shaped mirror may be driven to move along a first direction, and/or the right-angle prism may be driven to move along a second direction. The first direction is opposite to the second direction, and both the first direction and the second direction are directions perpendicular to the principal optical axis.

In an embodiment, the L-shaped mirror may be driven to move along the direction perpendicular to the principal optical axis.

In an embodiment, the L-shaped mirror and/or the right-angle prism may be further driven to move along a third direction, to perform optical image stabilization on the rays from the optical lens component. The third direction is a direction parallel to the principal optical axis.

In an embodiment, a distance by which the L-shaped mirror and/or the right-angle prism are/is driven to move along the third direction is less than a preset distance. For the preset distance, refer to the descriptions of the preset distance in the first aspect. Details are not described herein again.

According to a fifth aspect, this application provides an imaging apparatus, where the imaging apparatus may be used in a terminal device. The terminal device includes a first camera. The first camera includes an optical lens component, a ray adjustment component, and an image sensor. The optical lens component is configured to receive rays from a photographed object. The ray adjustment component is configured to fold an optical path of the rays propagated from the optical lens component. The imaging apparatus is configured to perform the method according to any one of the fourth aspect or the implementations of the fourth aspect. The imaging apparatus includes corresponding functional modules, which are configured to implement the operations in the foregoing methods. For details, refer to the detailed descriptions in the method examples. Details are not described herein again. The functions may be implemented by hardware, or may be implemented by hardware by executing corresponding software. The hardware or software includes one or more modules corresponding to the foregoing functions.

According to a sixth aspect, this application provides a terminal device. The terminal device may include a memory, a processor, and a first camera. The first camera includes an optical lens component, a ray adjustment component, and an image sensor. The optical lens component is configured to receive rays from a photographed object. The ray adjustment component is configured to fold an optical path of the rays propagated from the optical lens component. The memory may be coupled to the processor, and is configured to store a program or instructions. The processor is configured to invoke the program or the instructions, so that the terminal device performs the method according to any one of the fourth aspect or the implementations of the fourth aspect.

According to a seventh aspect, this application provides a terminal device. The terminal device may include a first camera, a second camera, and a third camera. The first camera and the second camera are both fixed-focus cameras, and the third camera is a wide-angle camera. A magnification of the first camera is A1, a magnification of the second camera is A2, and a zoom ratio of the third camera is A3. A2 is greater than 1 and less than A1, and A3 is less than 1.

In an embodiment, the first camera may include the compact camera module according to any one of the first aspect or the implementations of the first aspect.

In an embodiment, a value range of A1 is [8, 12].

In an embodiment, the terminal device further includes a depth camera.

According to an eighth aspect, this application provides a computer-readable storage medium. The computer-readable storage medium stores a computer program or instructions. When the computer program or the instructions is or are run on a terminal device, the terminal device is enabled to perform the method according to any one of the fourth aspect or the possible implementations of the fourth aspect.

According to a ninth aspect, this application provides a computer program product. The computer program product includes a computer program or instructions. When the computer program or the instructions is or are executed by a terminal device, the method according to any one of the fourth aspect or the possible implementations of the fourth aspect is implemented.

For technical effects that can be achieved in any one of the second aspect to the seventh aspect, refer to descriptions of beneficial effects in the first aspect. Details are not described herein again.

DESCRIPTION OF EMBODIMENTS

Figure 1:
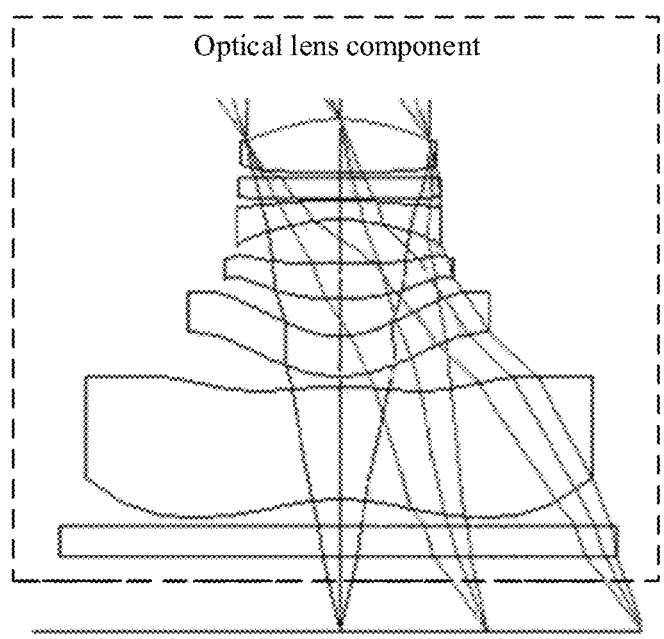
FIG. 1 is a schematic diagram depicting a structure of a camera in a conventional technology.

To make the objectives, technical solutions, and advantages of this application clearer, the following further describes this application in detail with reference to the accompanying drawings.

The following provides general explanation and descriptions of some terms in this application, to help a person skilled in the art have a better understanding, but this does not constitute any limitation on the terms in this application.

1. Focal length: The focal length indicates a capability of bending rays. A shorter focal length indicates a higher capability of bending rays. A focal length of an optical lens component determines a size of an image, of an object photographed by the optical lens component, generated on an imaging plane. Assuming that a same object is photographed at a same distance, a longer focal length of the optical lens component indicates a higher magnification of an image, of the object, generated on a photosensitive element (for example, a charge-coupled device (CCD)).

2. Equivalent focal length: The equivalent focal length is a measure of converting angles of view for imaging on photosensitive elements of different sizes into a focal length, of an optical lens component, corresponding to a same angle of view for imaging on a 135 compact camera module (35 mm film compact camera module), where the focal length obtained through conversion is a 135 equivalent focal length (35 mm equivalent focal length), that is, the equivalent focal length. It may also be understood that a focal length of a non-135 compact camera module (non-35 mm film compact camera module) is converted into a focal length of a 135 compact camera module (35 mm film compact camera module) by using the 135 compact camera module (35 mm film compact camera module) as a reference. Optionally, the equivalent focal length is calculated as follows: Equivalent focal length=Physical focal length of the optical lens component×Focal length coefficient (or focal length multiplier), where the focal length coefficient is a ratio of a diagonal length of a photosensitive element of a non-135 compact camera module (non-35 mm film compact camera module) to a diagonal length of a photosensitive element of a 135 compact camera module (35 mm film compact camera module). For example, if a physical focal length of the optical lens component is 31 mm, a diagonal length of a photosensitive element of a non-135 compact camera module (non-35 mm film compact camera module) is 4.8 mm, and a diagonal length of a photosensitive element of a 135 compact camera module (35 mm film compact camera module) is 43.27 mm, the equivalent focal length is 31×43.27/4.8, that is, approximately 280 mm.

3. Optical zoom: Optical zoom mainly refers to ratio comparison and switching between different focal lengths in the compact camera module. An optical zoom ratio may be used to indicate an optical zoom capability. A higher optical zoom ratio indicates that a farther object can be photographed. The optical zoom ratio is related to a physical focal length of the optical lens component. A 28 mm equivalent focal length of the compact camera module usually corresponds to a 1×(namely, 1 times) optical zoom ratio. For example, a diagonal length of a photosensitive element of a 135 compact camera module (35 mm film compact camera module) is 43.27 mm. If a diagonal length of a photosensitive element of a non-135 compact camera module (non-35 mm film compact camera module) is 4.8 mm, and a physical focal length of the optical lens component is 31 mm, the equivalent focal length is 31×43.27/4.8, that is, approximately 280 mm. In this case, the optical zoom ratio of the compact camera module is 280/28, that is, 10×. For another example, if a diagonal length of a photosensitive element of a non-135 compact camera module (non-35 mm film compact camera module) is 4.8 mm, and a physical focal length of the optical lens component is 20 mm, the equivalent focal length is 20×43.27/4.8, that is, approximately 180 mm. In this case, the optical zoom ratio of the compact camera module is 180/28, that is, approximately 6.4×.

4. Focus: Focus is a process of changing an image distance by using a component capable of changing a focal length in the compact camera module, to make an image of a photographed object clear. Focus includes autofocus and manual focus. Autofocus (autofocus) is a manner in which reflected rays are received by a photosensitive element in the compact camera module by using a reflection principle of rays of objects, and an actuator is driven for focusing based on computing processing of a terminal device. For example, the compact camera module emits an infrared ray (or another ray), determines a distance of a photographed object based on reflection of the photographed object, and then adjusts an image distance based on a measured result to implement autofocus.

5. Optical image stabilization, also referred to as shake compensation, is a technique to compensate for an imaging ray offset resulting from shaking by moving the optical lens component or another component in the compact camera module, to stabilize an optical path, and further effectively reduce image blurring caused due to shaking of the compact camera module.

Figure 2:
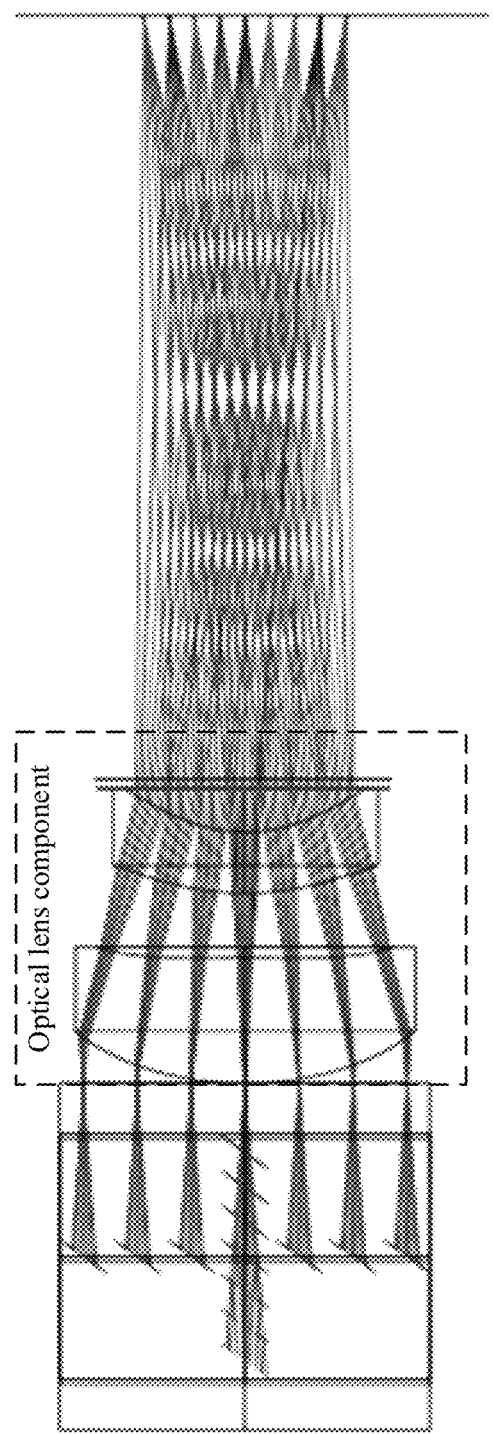
FIG. 2 is a schematic diagram depicting a structure of a camera in a conventional technology.

As described in the background, the current structure of the compact camera module is shown in FIG. 1 or FIG. 2. The compact camera module implements focusing by driving an imaging lens to move, and a long optical path for imaging is required. Consequently, a size of the compact camera module is large.

In view of the foregoing problem, this application provides a compact camera module. The compact camera module can use a ray adjustment component to fold an optical path of rays propagated from an optical lens component, to help reduce a space length occupied by an optical path for imaging, and further reduce a size of the compact camera module.

The following describes in detail the compact camera module provided in this application with reference to FIG. 3 to FIG. 9.

Figure 3:
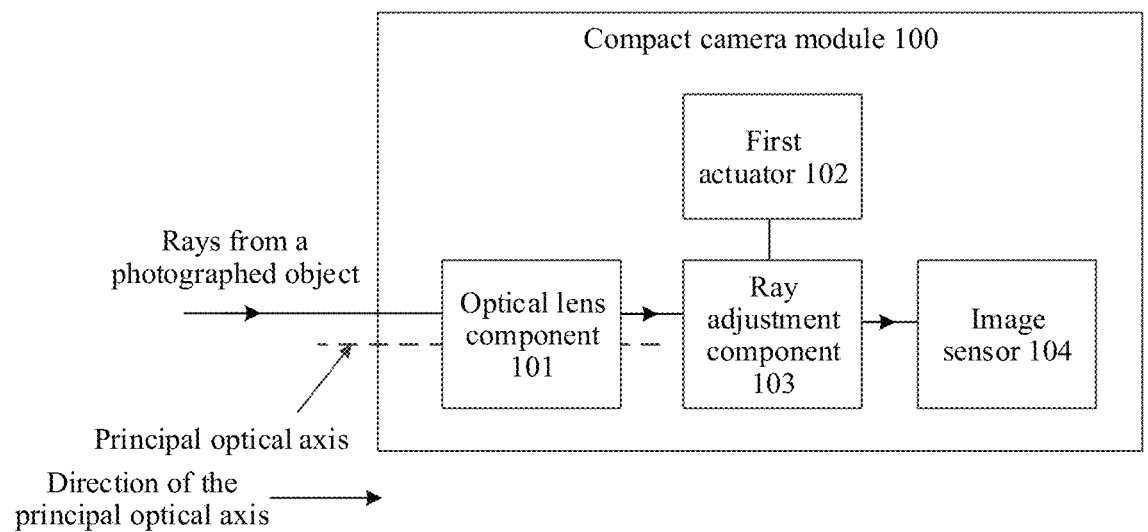
FIG. 3 is a schematic diagram depicting a structure of a compact camera module according to an embodiment.

FIG. 3 is a schematic diagram depicting a structure of a compact camera module according to an embodiment. The compact camera module may include an optical lens component 101, a first actuator 102, a ray adjustment component 103, and an image sensor 104. The ray adjustment component 103 and the image sensor 104 are sequentially disposed along a direction of a principal optical axis of the optical lens component. The optical lens component is configured to receive rays from a photographed object. The ray adjustment component is configured to fold an optical path of the rays propagated from the optical lens component. The first actuator is configured to drive the ray adjustment component to move, so that the rays whose optical path is folded are focused on the image sensor. The image sensor is configured to perform imaging based on the focused rays.

Based on the compact camera module, the ray adjustment component folds the optical path of the rays propagated from the optical lens component. This helps shorten an optical path for imaging. When a physical focal length of the optical lens component is given, the ray adjustment component folds the optical path of the rays, so that an image distance can meet an imaging condition, and the optical path for imaging can be shortened. In this way, a size of the compact camera module can be reduced. It may also be understood that, when the compact camera module is located in limited space, an optical lens component with a long physical focal length may be used when the compact camera module in this application is used, so that a high optical zoom ratio can be implemented. Further, in this application, the first actuator drives the ray adjustment component to move, to implement focusing of the rays whose optical path is folded, without a need to move the optical lens component. In other words, the optical lens component does not need to be coupled to the first actuator.

It should be noted that the photographed object includes but is not limited to a single object. For example, when a person is photographed, the photographed object includes the person and a scene around the person, that is, the scene around the person is also a part of the photographed object. It may also be understood that all objects within a field of view of the optical lens component may be classified as photographed objects.

In an embodiment, that the ray adjustment component and the image sensor are sequentially disposed along a direction of a principal optical axis means that both the ray adjustment component and the image sensor pass through the principal optical axis. For example, the principal optical axis may pass through a middle part of the ray adjustment component, or the principal optical axis may pass through an upper part of the ray adjustment component, or the principal optical axis may pass through a lower part of the ray adjustment component. The principal optical axis may pass through a middle part of the image sensor, or the principal optical axis may pass through an upper part of the image sensor, or the principal optical axis may pass through a lower part of the image sensor.

In an embodiment, the principal optical axis may be bidirectional or unidirectional (refer to FIG. 3).

The following separately describes the functional components shown in FIG. 3, to provide specific example implementation solutions. For ease of description, the following optical lens component, first actuator, ray adjustment component, and image sensor are described without reference signs.

1. Optical Lens Component

Figure 4A:
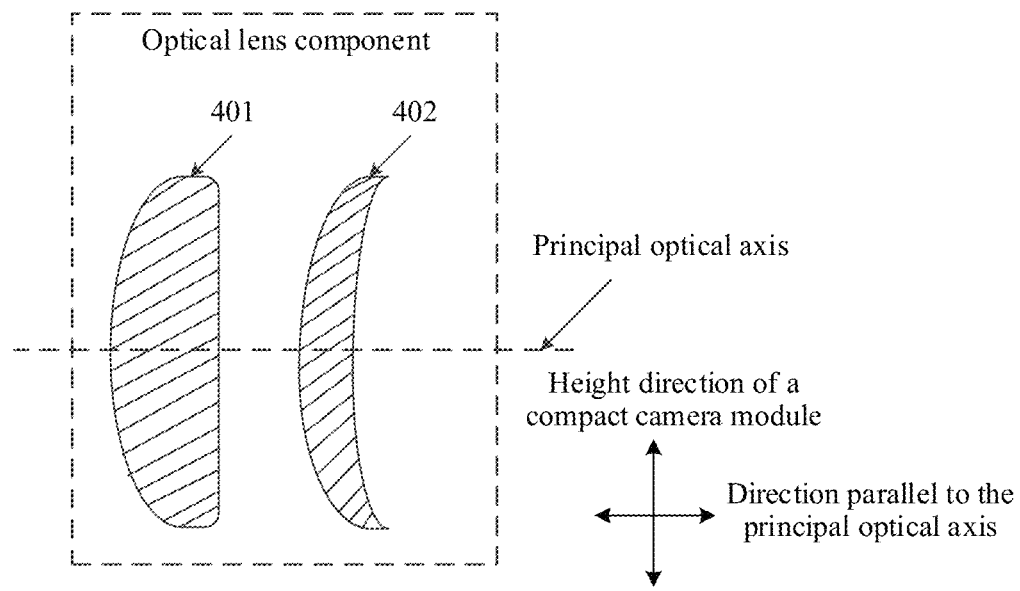
FIG. 4a is a schematic diagram depicting a structure of an optical lens component according to an embodiment.

For example, FIG. 4a is a schematic diagram depicting a structure of an optical lens component. The optical lens component includes a first lens element 401 and a second lens element 402. The first lens element 401 is a plane-convex lens, the second lens element 402 is a convex-concave lens, and the convex-concave lens is a lens element whose central part is thinner than an edge part. Compared with the second lens element 402, the first lens element 401 is closer to a photographed object and farther away from the image sensor. Compared with the first lens element 401, the second lens element 402 is closer to the image sensor and farther away from the photographed object.

Figure 4B:
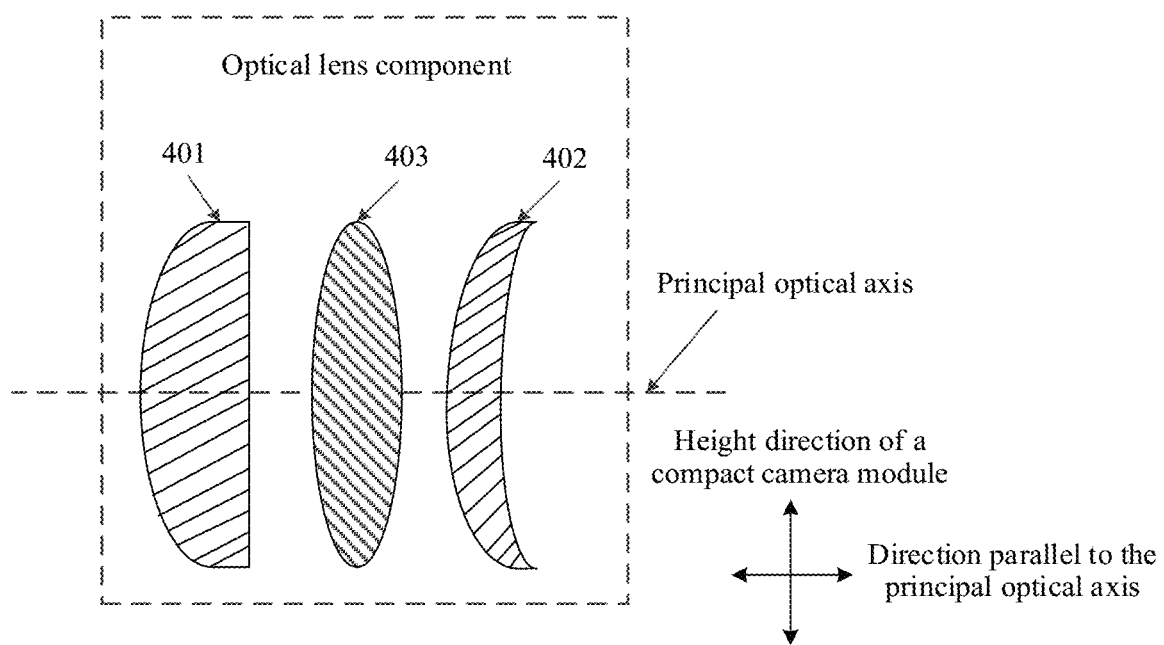
FIG. 4b is a schematic diagram depicting a structure of another optical lens component according to an embodiment.

For another example, FIG. 4b is a schematic diagram depicting a structure of another optical lens component. The optical lens component includes a first lens element 401, a second lens element 402, and a third lens element 403. The third lens element 403 is located between the first lens element 401 and the second lens element 402. The first lens element 401 is a plane-convex lens, the second lens element 402 is a convex-concave lens, and the third lens element 403 is a biconvex lens. Compared with the second lens element 402 and the third lens element 403, the first lens element 401 is closer to a photographed object and farther away from the image sensor. Compared with the first lens element 401 and the third lens element 403, the second lens element 402 is closer to the image sensor and farther away from the photographed object. It should be understood that the structure of the optical lens component shown in FIG. 4a or FIG. 4b is merely an example. The optical lens component in this application may include more lens elements than those shown in FIG. 4b. For example, the optical lens component may include more than three lens elements. The lens element may be any one of a biconvex lens, a plane-convex lens, or a convex-concave lens. This is not limited in this application.

A principal optical axis, also referred to as a principal axis, is a straight line passing through two spherical centers of lens elements. As shown in FIG. 4a, a straight line passing through spherical centers of the first lens element 401 and the second lens element 402 is referred to as a principal optical axis. As shown in FIG. 4b, a straight line passing through spherical centers of the first lens element 401, the second lens element 402, and the third lens element 403 is referred to as a principal optical axis.

In an embodiment, to suppress temperature drift, at least one lens element in the optical lens component is made of glass. It may also be understood that the lens elements in the optical lens component cannot be all plastic lens elements.

Further, in an embodiment, to minimize the height of the compact camera module (a height direction of the compact camera module is consistent with a thickness direction of a terminal device), the lens element in the optical lens component may be cut along the height direction of the compact camera module (refer to FIG. 4a or FIG. 4b). For example, the lens element may be cut in an I-cut mode.

2. Ray Adjustment Component

In an embodiment, the ray adjustment component may include M first reflection surfaces and M second reflection surfaces. The M first reflection surfaces are disposed one-to-one opposite to the M second reflection surfaces, that is, one first reflection surface corresponds to one opposite disposed second reflection surface. The M first reflection surfaces are sequentially connected, an included angle between any two adjacent first reflection surfaces is $\theta_1$, and $\theta_1$ is greater than 0 degrees and less than 180 degrees. The M second reflection surfaces are sequentially connected, an included angle between any two adjacent second reflection surfaces is $\theta_2$, and $\theta_2$ is greater than 0 degrees and less than 180 degrees. M is an integer greater than or equal to 2. Further, optionally, a first reflection surface in the M first reflection surfaces that is closest to the optical lens component is configured to receive and reflect rays from the optical lens component, and a first reflection surface in the M first reflection surfaces that is closest to the image sensor is configured to reflect, to the image sensor, the rays whose optical path is folded. It should be understood that the included angle $\theta_1$ between two adjacent first reflection surfaces is a minimum angle formed through intersection between the two adjacent first reflection surfaces, and the included angle $\theta_2$ between two adjacent second reflection surfaces is a minimum angle formed through intersection between the two adjacent second reflection surfaces.

In an embodiment, $\theta_1$ is greater than or equal to 60 degrees and less than or equal to 120 degrees, that is, $60° \leq \theta_1 \leq 120°$; and $\theta_2$ is greater than or equal to 60 degrees and less than or equal to 120 degrees, that is, $60° \leq \theta_2 \leq 120°$. For example, $\theta_1$ may be 30 degrees, 45 degrees, 60 degrees, 90 degrees, 120 degrees, 135 degrees, or 150 degrees; and $\theta_2$ may be 30 degrees, 45 degrees, 60 degrees, 90 degrees, 120 degrees, 135 degrees, or 150 degrees.

Figure 5A:
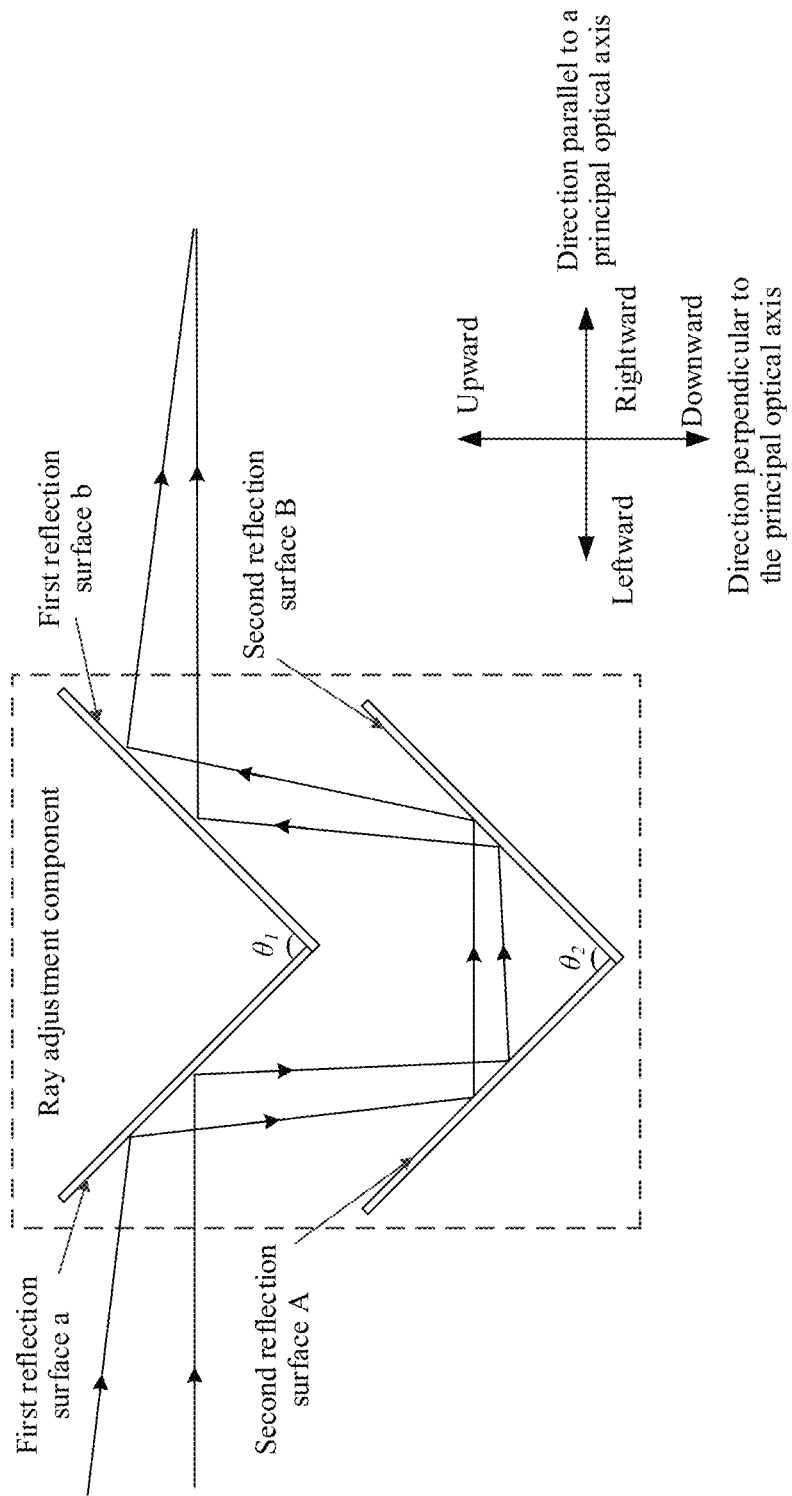
FIG. 5a is a schematic diagram depicting a structure of a ray adjustment component according to an embodiment.

FIG. 5a is a schematic diagram depicting a structure of a ray adjustment component according to this application. Descriptions of the ray adjustment component are provided by using the example of M equal to 2. The ray adjustment component includes two first reflection surfaces (a first reflection surface a and a first reflection surface b) and two second reflection surfaces (a second reflection surface A and a second reflection surface B). The first reflection surface a and the first reflection surface b are sequentially connected, and an included angle $\theta_1$ between the first reflection surface a and the first reflection surface b is greater than 0 degrees and less than 180 degrees. The second reflection surface A and the second reflection surface B are sequentially connected, and an included angle $\theta_2$ between the second reflection surface A and the second reflection surface B is greater than 0 degrees and less than 180 degrees. The first reflection surface a is disposed opposite to the second reflection surface A, and the first reflection surface b is disposed opposite to the second reflection surface B. The first reflection surface a is a first reflection surface closest to the optical lens component. The first reflection surface a is configured to receive rays from the optical lens component, and reflect the rays propagated from the optical lens component to the second reflection surface A. The first reflection surface b is a first reflection surface closest to the image sensor. The first reflection surface b is configured to reflect, to the image sensor, the rays whose optical path is folded.

In an embodiment, when the compact camera module uses the structure of the ray adjustment component shown in FIG. 5a, an optical lens component whose physical focal length is not less than 20 mm may be used, a corresponding equivalent focal length is not less than 180 mm, and an optical zoom ratio of the compact camera module is not less than 6 times. It can be learned that folding the optical path of the rays propagated from the optical lens component can implement a high optical zoom ratio, for example, 6×, 8×, or 10×, for the compact camera module. Further, the height of the compact camera module is not greater than 9 mm and the length of the compact camera module is not greater than 40 mm, so that the compact camera module can be integrated into the terminal device.

Figure 5B:
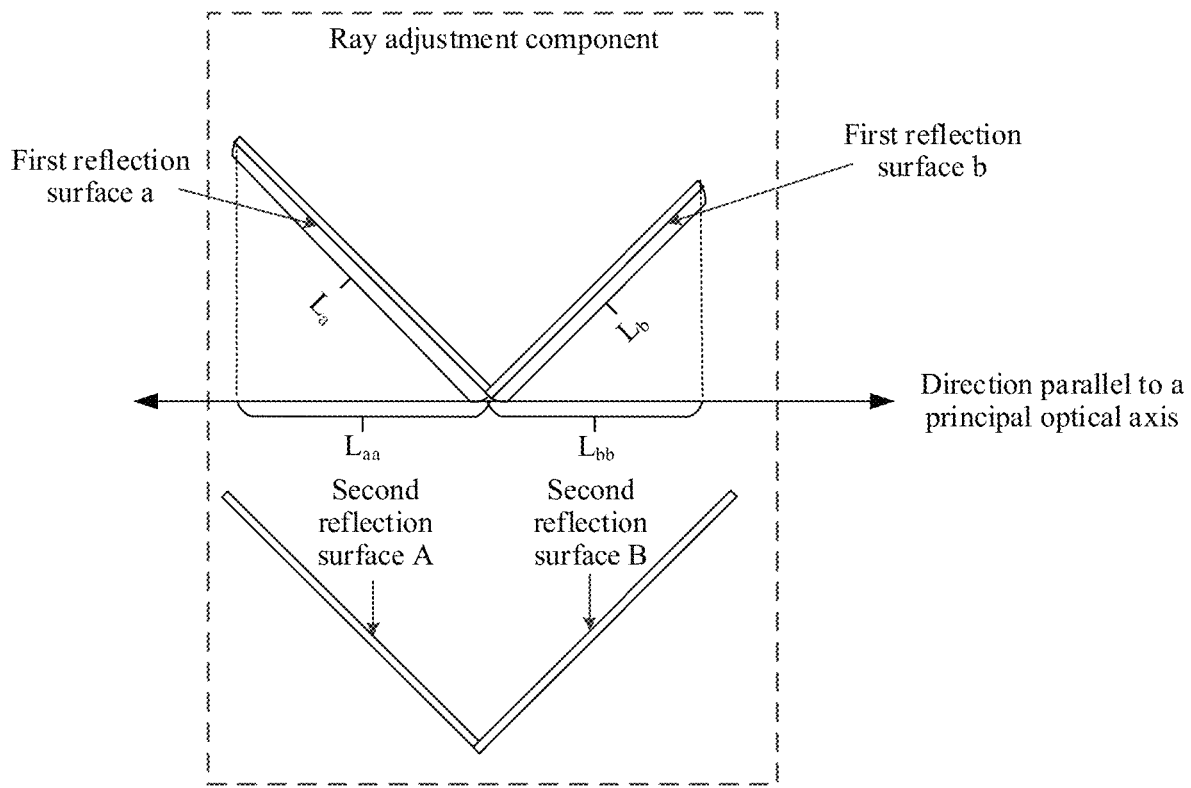
FIG. 5b is a front view of a ray adjustment component according to an embodiment.

It should be noted that projections of lengths of the M first reflection surfaces in a direction parallel to a principal optical axis may be equal or unequal. In an embodiment, the direction parallel to the principal optical axis may be the same as a direction of the principal optical axis. FIG. 5b is a front view of a ray adjustment component according to this application. For example, in FIG. 5b, there are two first reflection surfaces: a first reflection surface a and a first reflection surface b. A length of the first reflection surface a is $L_a$, and a length of the first reflection surface b is $L_b$. A projection of the length $L_a$ of the first reflection surface a in a direction parallel to a principal optical axis is $L_{aa}$, and a projection of the length $L_b$ of the first reflection surface b in the direction parallel to the principal optical axis is $L_{bb}$. $L_{aa}$ and $L_{bb}$ may be equal or unequal. In other words, $L_{aa}$ is greater than $L_{bb}$, or $L_{aa}$ is less than $L_{bb}$, or $L_{aa}$ is equal to $L_{bb}$. It should be understood that a length of a second reflection surface A is $L_A$, a length of a second reflection surface B is $L_B$, a projection of the length $L_A$ of the second reflection surface A in the direction parallel to the principal optical axis is $L_{AA}$, and a projection of the length $L_B$ of the second reflection surface B in the direction parallel to the principal optical axis is $L_{BB}$. $L_{AA}$ and $L_{BB}$ may be equal or unequal. In other words, $L_{AA}$ is greater than $L_{BB}$, or $L_{AA}$ is less than $L_{BB}$, or $L_{AA}$ is equal to $L_{BB}$.

In an embodiment, a layered structure constituted by the M first reflection surfaces does not overlap a layered structure constituted by the M second reflection surfaces. For example, the M first reflection surfaces are located at a first layer, the M second reflection surfaces are located at a second layer, and the first layer and the second layer do not overlap each other. Further, optionally, the first layer is located above the second layer.

With reference to FIG. 5a, the first reflection surface a and the first reflection surface b constitute the first layer, and the second reflection surface A and the second reflection surface B constitute the second layer. The first reflection surface a is configured to receive the rays propagated from the optical lens component, and reflect the received rays to the second reflection surface A. The second reflection surface A is configured to reflect the received rays to the second reflection surface B. The second reflection surface B is configured to reflect the received rays to the first reflection surface b. The first reflection surface b is configured to reflect, to the image sensor, the rays whose optical path is folded. To be specific, the optical path, of the rays propagated from the optical lens component, in the ray adjustment component is as follows: The first reflection surface a reflects the rays to the second reflection surface A, the second reflection surface A reflects the rays to the second reflection surface B, the second reflection surface B reflects the rays to the first reflection surface b, and the first reflection surface b reflects the rays to the image sensor. That is, the rays propagated from the optical lens component undergo four times of bending in the ray adjustment component. In this way, the optical path of the rays propagated from the optical lens component is folded, and this helps shorten a length of the compact camera module. A length direction of the compact camera module is perpendicular to a height direction of the compact camera module (refer to FIG. 4a or FIG. 4b).

In an embodiment, an $i^{th}$ first reflection surface may be parallel to an $i^{th}$ second reflection surface, the $i^{th}$ first reflection surface is disposed opposite to the $i^{th}$ second reflection surface, the $i^{th}$ first reflection surface is one of the M first reflection surfaces, and the $i^{th}$ second reflection surface is one of the M second reflection surfaces. The $i^{th}$ first reflection surface and the $i^{th}$ second reflection surface are disposed in parallel, to facilitate assembly of the compact camera module. It can be understood that, if the first reflection surface is not parallel to the opposite disposed second reflection surface, when the compact camera module is horizontally placed for image shooting, an image formed on the image sensor may be tilted.

With reference to FIG. 5a, the $i^{th}$ first reflection surface may be the first reflection surface a or the first reflection surface b, and the $i^{th}$ second reflection surface is the second reflection surface A or the second reflection surface B. If the $i^{th}$ first reflection surface is the first reflection surface a, the $i^{th}$ second reflection surface is the second reflection surface A, the first reflection surface a is parallel to the second reflection surface A, and the first reflection surface a is disposed opposite to the second reflection surface A. If the $i^{th}$ first reflection surface is the first reflection surface b, the $i^{th}$ second reflection surface is the second reflection surface B, the first reflection surface b is parallel to the second reflection surface B, and the first reflection surface b is disposed opposite to the second reflection surface B.

With reference to FIG. 5a, that the $i^{th}$ first reflection surface is parallel to the $i^{th}$ second reflection surface includes: The first reflection surface a is parallel to the second reflection surface A, and the first reflection surface b is parallel to the second reflection surface B; or the first reflection surface a is parallel to the second reflection surface A, and the first reflection surface b is not parallel to the second reflection surface B; or the first reflection surface a is not parallel to the second reflection surface A, and the first reflection surface b is parallel to the second reflection surface B. It should be understood that $\theta_1$ is equal to $\theta_2$ if the first reflection surface a is parallel to the second reflection surface A and the first reflection surface b is parallel to the second reflection surface B.

Figure 5C:
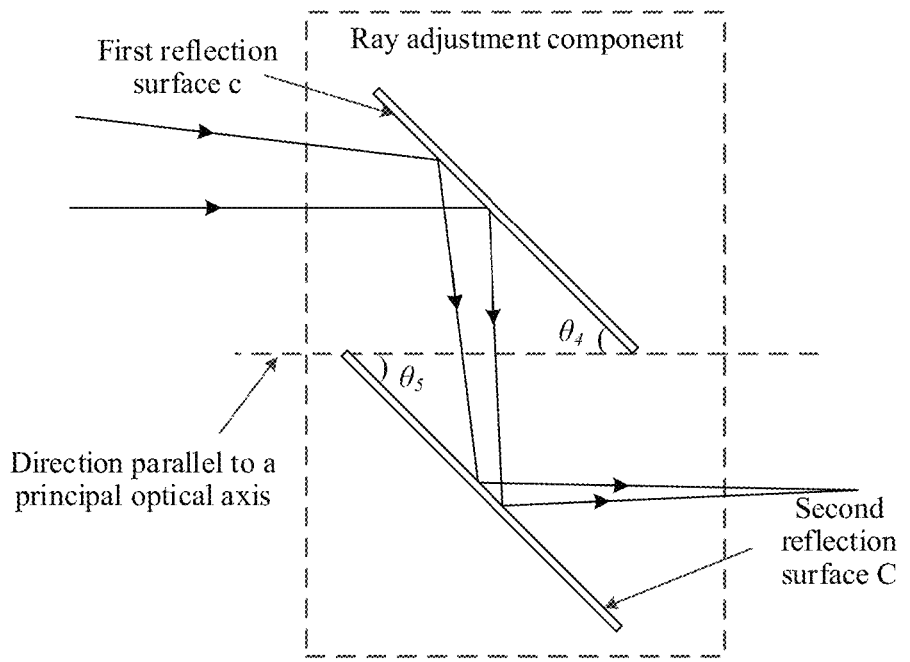
FIG. 5c is a schematic diagram depicting a structure of another ray adjustment component according to an embodiment.

FIG. 5c is a schematic diagram depicting a structure of another ray adjustment component according to this application. The ray adjustment component includes one first reflection surface and one second reflection surface, the first reflection surface is disposed opposite to the second reflection surface, an included angle between the first reflection surface and a direction parallel to a principal optical axis is $\theta_4$, and $\theta_4$ is greater than 0 degrees and less than 90 degrees; an included angle between the second reflection surface and the direction parallel to the principal optical axis is $\theta_5$, and $\theta_5$ is greater than 0 degrees and less than 90 degrees. The first reflection surface is configured to receive and reflect rays from the optical lens component to the second reflection surface, and the second reflection surface is configured to reflect, to the image sensor, the rays whose optical path is folded. To be specific, the optical path of the rays propagated from the optical lens component in the ray adjustment component is as follows: A first reflection surface c reflects the rays to a second reflection surface C, and the second reflection surface C reflects the rays to the image sensor. In other words, the rays propagated from the optical lens component undergo two times of bending in the ray adjustment component, so that the optical path of the rays propagated from the optical lens component is folded.

In an embodiment, $\theta_4$ is greater than or equal to 30 degrees and less than or equal to 60 degrees, that is, $30° \leq \theta_4 \leq 60°$; $\theta_5$ is greater than or equal to 30 degrees and less than or equal to 60 degrees, that is, $30° \leq \theta_5 \leq 60°$. For example, $\theta_4$ may be 30 degrees, 45 degrees, or 60 degrees; $\theta_5$ may be 30 degrees, 45 degrees, or 60 degrees.

It should be noted that, for the first reflection surface c shown in FIG. 5c, refer to the descriptions of the first reflection surface a or the first reflection surface b; for the second reflection surface C, refer to the descriptions of the second reflection surface A or the second reflection surface B; for a positional relationship between the first reflection surface c and the second reflection surface C, refer to the positional relationship between the first reflection surface a and the second reflection surface A, or refer to the positional relationship between the first reflection surface b and the second reflection surface B. Details are not described herein again. In other words, the first reflection surface c and the second reflection surface C may be understood as the first reflection surface a and the second reflection surface A shown in FIG. 5a, or may be understood as the first reflection surface b and the second reflection surface B shown in FIG. 5a.

In an embodiment, the M first reflection surfaces may be reflection surfaces of M/2 sequentially connected L-shaped mirrors, where any one of the M/2 L-shaped mirrors includes two reflection surfaces. Reflection surfaces of an L-shaped mirror may be understood as two reflection surfaces of the L-shaped mirror that are formed by coating reflection films on two mutually perpendicular surfaces of an L-shaped device. It should be noted that the L-shaped mirror has an integrated structure.

Figure 6A:
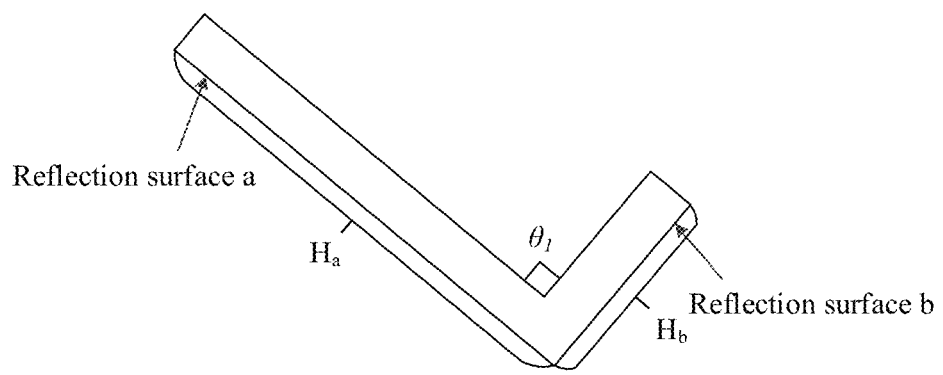
FIG. 6a is a front view of an L-shaped mirror according to an embodiment.
Figure 6B:
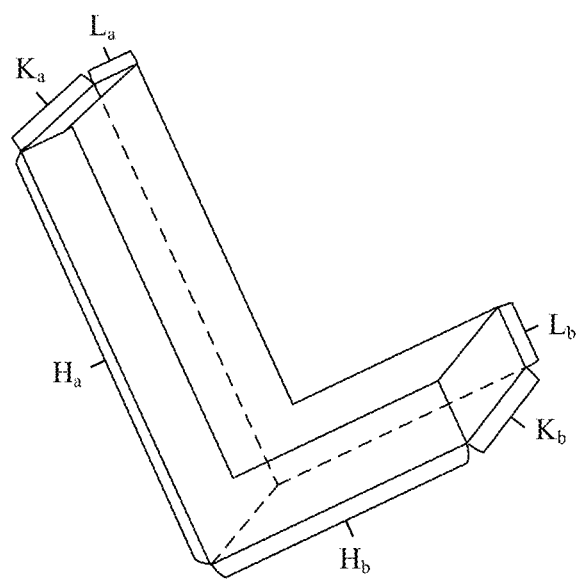
FIG. 6b is a schematic three-dimensional diagram depicting a structure of an L-shaped mirror according to an embodiment.

FIG. 6a is a front view of an L-shaped mirror according to this application. Two reflection surfaces of the L-shaped mirror are perpendicular to each other, that is, $\theta_1 = 90°$. The two reflection surfaces of the L-shaped mirror are a reflection surface a and a reflection surface b, and both the reflection surface a and the reflection surface b are first reflection surfaces. It should be understood that the reflection surface a and the reflection surface b may be two outer surfaces on one side of the L-shaped mirror. With reference to FIG. 6b, the reflection surface a has a length of $H_a$, a width of $K_a$, and a thickness of $L_a$; the reflection surface b has a length of $H_b$, a width of $K_b$, and a thickness of $L_b$. Further, optionally, lengths of the two reflection surfaces of the L-shaped mirror may be equal or unequal. In other words, $H_a$ may be equal to $H_b$; or $H_a$ may be greater than $H_b$; or $H_a$ may be less than $H_b$. FIG. 6a uses only an example in which $H_a$ is greater than $H_b$. In an embodiment, a value range of a length of a longer reflection surface may be [7, 12] (unit: millimeter (mm)), and a value range of a length of a shorter reflection surface may be [4, 8] (unit: mm). With reference to FIG. 6a, a value range of $H_a$ may be [7, 12] (unit: mm), and a value range of $H_b$ may be [4, 8] (unit: mm).

Further, in an embodiment, widths of the two reflection surfaces of the L-shaped mirror may be equal or unequal. With reference to FIG. 6a and FIG. 6b, the width of the reflection surface a may be equal to or unequal to the width of the reflection surface b. That is, $K_a$ may be equal to $K_b$; or $K_a$ may be greater than $K_b$; or $K_a$ may be less than $K_b$. In an embodiment, a value range of the widths of the two reflection surfaces of the L-shaped mirror may be [3, 10] (unit: mm).

Further, in an embodiment, thicknesses of the two reflection surfaces of the L-shaped mirror may be equal or unequal. With reference to FIG. 6a and FIG. 6b, the thickness of the reflection surface a may be equal to or unequal to the thickness of the reflection surface b. That is, $L_a$ may be equal to $L_b$; or $L_a$ may be greater than $L_b$; or $L_a$ may be less than $L_b$. In an embodiment, a value range of the thicknesses of the two reflection surfaces of the L-shaped mirror may be [0.8, 4] (unit: mm).

It should be understood that, compared with the reflection surface b, the reflection surface a shown in FIG. 6a is closer to the optical lens component and farther away from the image sensor; compared with the reflection surface a shown in FIG. 6a, the reflection surface b is closer to the image sensor and farther away from the optical lens component. FIG. 6b may be a three-dimensional view of the L-shaped mirror shown in FIG. 6a. It should be noted that, a projection, of the reflection surface a closer to the optical lens component, in a direction perpendicular to a principal optical axis is greater than or equal to the height of the optical lens component in the direction perpendicular to the principal optical axis. In this way, the rays from the optical lens component can be propagated to the reflection surface a closer to the optical lens component, and therefore utilization of the rays can be improved.

Alternatively, the M first reflection surfaces may be reflection surfaces of M sequentially connected mirrors (mirrors).

Figure 6C:
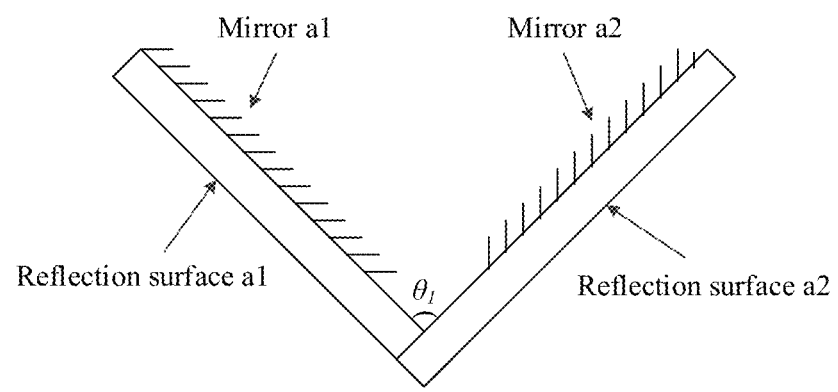
FIG. 6c is a schematic diagram depicting a structure in which two first reflection surfaces are reflection surfaces of two sequentially connected mirrors according to an embodiment.
Figure 6D:
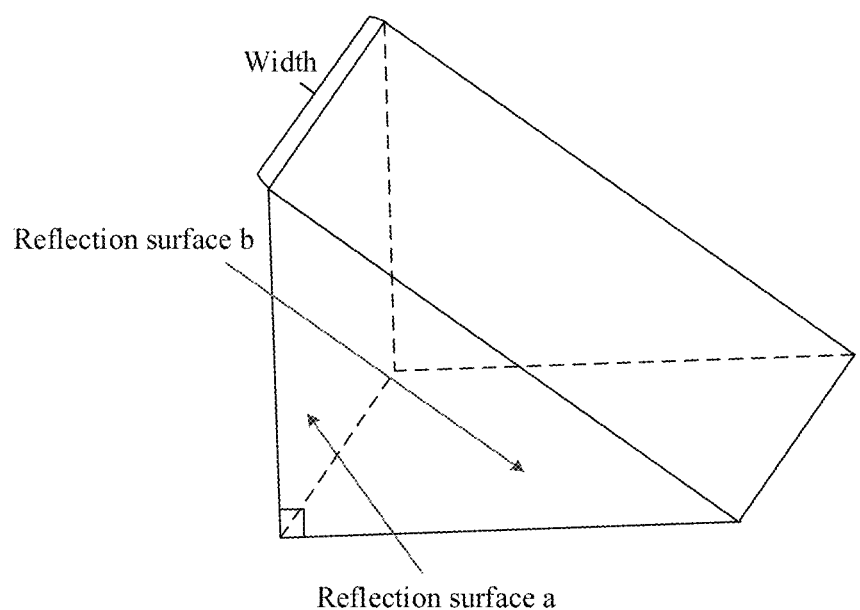
FIG. 6d is a schematic diagram depicting a structure of a right-angle prism according to an embodiment.

FIG. 6c is a schematic diagram depicting a structure in which two first reflection surfaces are reflection surfaces of two sequentially connected mirrors according to this application. The two mirrors are a mirror a1 and a mirror a2, the mirror a1 and the mirror a2 are sequentially connected, and an included angle between the mirror a1 and the mirror a2 is $\theta_1$. The mirror a1 corresponds to a reflection surface a1, and the mirror a2 corresponds to a reflection surface a2.

Alternatively, the M first reflection surfaces may be reflection surfaces of M/2 sequentially connected right-angle prisms. In an embodiment, reflection surfaces of a right-angle prism may be two right-angle surfaces of the right-angle prism. To be specific, the two first reflection surfaces are two mutually perpendicular reflection surfaces (refer to FIG. 6d) of one right-angle prism, and the two first reflection surfaces are the reflection surface a and the reflection surface b. In an embodiment, a value range of a right-angle edge of the right-angle prism may be [5, 20] (unit: mm), and a value range of the width may be [3, 10] (unit: mm). It should be understood that the two first reflection surfaces (namely, the reflection surface a and the reflection surface b) of the right-angle prism are inner surfaces of the two right-angle surfaces of the right-angle prism.

Alternatively, the M first reflection surfaces may be right-angle surfaces of P mirrors and Q right-angle prisms that are sequentially connected, where P+2Q=M, and both P and Q are positive integers. Reflection surfaces of a right-angle prism may be two right-angle surfaces of the right-angle prism.

Figure 6E:
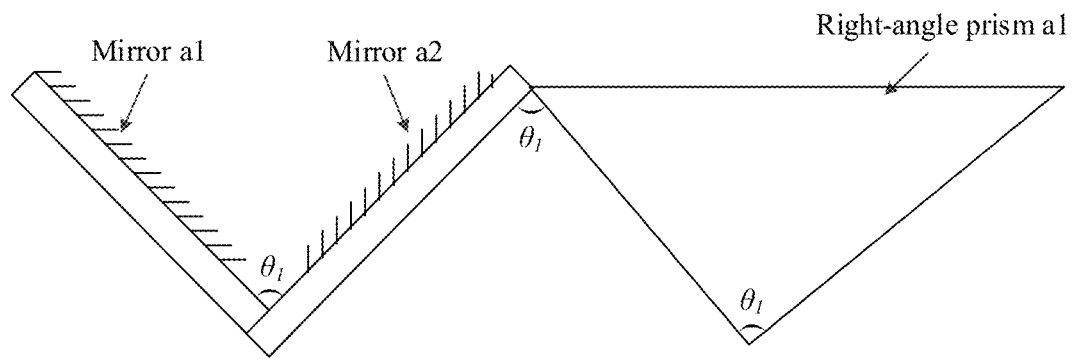
FIG. 6e is a schematic diagram depicting a structure in which four first reflection surfaces are reflection surfaces of two mirrors and one right-angle prism that are sequentially connected according to an embodiment.

FIG. 6e is a schematic diagram depicting a structure in which four first reflection surfaces are reflection surfaces of two mirrors and one right-angle prism that are sequentially connected according to this application. The two mirrors are a mirror a1 and a mirror a2. The mirror a1, the mirror a2, and a right-angle prism a1 are sequentially connected. An included angle between the mirror a1 and the mirror a2 is $\theta_1$. An included angle between two right-angle surfaces of the right-angle prism a1 is $\theta_1$. An included angle between the mirror a2 and one right-angle surface of the right-angle prism a1 is $\theta_1$. It should be understood that M is an integer greater than or equal to 3 when the M first reflection surfaces are reflection surfaces of P mirrors and Q right-angle prisms that are sequentially connected. In addition, when the M first reflection surfaces are the reflection surfaces of the P mirrors and the Q right-angle prisms that are sequentially connected, a quantity of mirrors may be greater than a quantity of right-angle prisms, or a quantity of mirrors may be less than a quantity of right-angle prisms, or a quantity of mirrors may be equal to a quantity of right-angle prisms. This is not limited in this application.

Alternatively, the M first reflection surfaces include reflection surfaces of m mirrors and n L-shaped mirrors that are sequentially connected, where m+2n=M, and both m and n are positive integers. Herein, M is an integer greater than or equal to 3.

Alternatively, the M first reflection surfaces include reflection surfaces of p right-angle prisms and q L-shaped mirrors that are sequentially connected, where 2p+2q=M, and both p and q are positive integers. Herein, M is an integer greater than or equal to 4.

Alternatively, the M first reflection surfaces include reflection surfaces of k right-angle prisms, t L-shaped mirrors, and h mirrors that are sequentially connected, where 2k+2t+h=M, and k, t, and h are all positive integers. Herein, M is an integer greater than or equal to 5.

In an embodiment, the M second reflection surfaces may be reflection surfaces of M/2 sequentially connected L-shaped mirrors, where any one of the M/2 L-shaped mirrors includes two reflection surfaces. For descriptions of the L-shaped mirror, refer to FIG. 6a.

Alternatively, the M second reflection surfaces may be reflection surfaces of M sequentially connected mirrors. For descriptions of the M sequentially connected mirrors, refer to FIG. 6c.

Alternatively, the M second reflection surfaces may be reflection surfaces of M/2 sequentially connected right-angle prisms. In an embodiment, reflection surfaces of a right-angle prism may be two right-angle surfaces of the right-angle prism.

Alternatively, the M second reflection surfaces may be reflection surfaces of K mirrors and L right-angle prisms that are sequentially connected, where K+2L=M, and both K and L are positive integers. For details, refer to the foregoing descriptions of FIG. 6e. It should be understood that M is also an integer greater than or equal to 3 when the M second reflection surfaces are the reflection surfaces of the K mirrors and the L right-angle prisms that are sequentially connected. In addition, when the M second reflection surfaces are the reflection surfaces of the K mirrors and the L right-angle prisms that are sequentially connected, a quantity of mirrors may be greater than a quantity of right-angle prisms, or a quantity of mirrors may be less than a quantity of right-angle prisms, or a quantity of mirrors may be equal to a quantity of right-angle prisms. This is not limited in this application.

Alternatively, the M second reflection surfaces include reflection surfaces of u mirrors and v L-shaped mirrors that are sequentially connected, where u+2v=M, and both u and v are positive integers. Herein, M is an integer greater than or equal to 3.

Alternatively, the M second reflection surfaces include reflection surfaces of l right-angle prisms and s L-shaped mirrors that are sequentially connected, where 2l+2s=M, and both l and s are positive integers. Herein, M is an integer greater than or equal to 4.

Alternatively, the M second reflection surfaces include reflection surfaces of j right-angle prisms, w L-shaped mirrors, and z mirrors that are sequentially connected, where 2j+2w+z=M, and j, w, and z are all positive integers. Herein, M is an integer greater than or equal to 5.

Based on the foregoing possible structures of the first reflection surface and the second reflection surface, the following illustrates 10 possible cases of the ray adjustment component.

Case 1: The M first reflection surfaces are reflection surfaces of M sequentially connected mirrors, and the M second reflection surfaces are reflection surfaces of M sequentially connected mirrors.

Figure 7A:
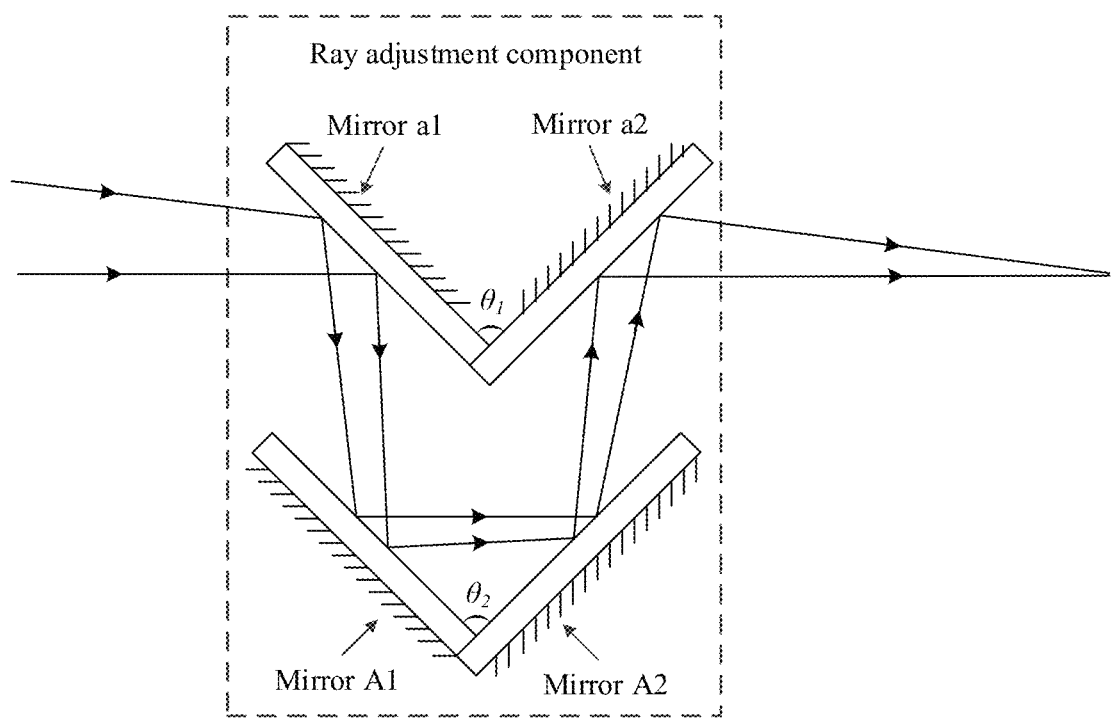
FIG. 7a is a schematic diagram depicting a structure of still another ray adjustment component according to an embodiment.

For example, M=2. FIG. 7a is a schematic diagram depicting a structure of still another ray adjustment component according to this application. The ray adjustment component includes four mirrors: a mirror a1, a mirror a2, a mirror A1, and a mirror A2. A reflection surface of the mirror a1 and a reflection surface of the mirror a2 are both referred to as first reflection surfaces, and the mirror a1 and the mirror a2 are sequentially connected. A reflection surface of the mirror A1 and a reflection surface of the mirror A2 are both referred to as second reflection surfaces, and the mirror A1 and the mirror A2 are sequentially connected. The reflection surface of the mirror a1 is disposed opposite to the reflection surface of the mirror A1, and the reflection surface of the mirror a2 is disposed opposite to the reflection surface of the mirror A2.

Based on FIG. 7a, an included angle between the mirror a1 and the mirror a2 is $\theta_1$, and an included angle between the mirror A1 and the mirror A2 is $\theta_2$.

Case 2: The M first reflection surfaces are reflection surfaces of M/2 sequentially connected right-angle prisms, and the M second reflection surfaces are reflection surfaces of M/2 sequentially connected right-angle prisms.

Figure 7B:
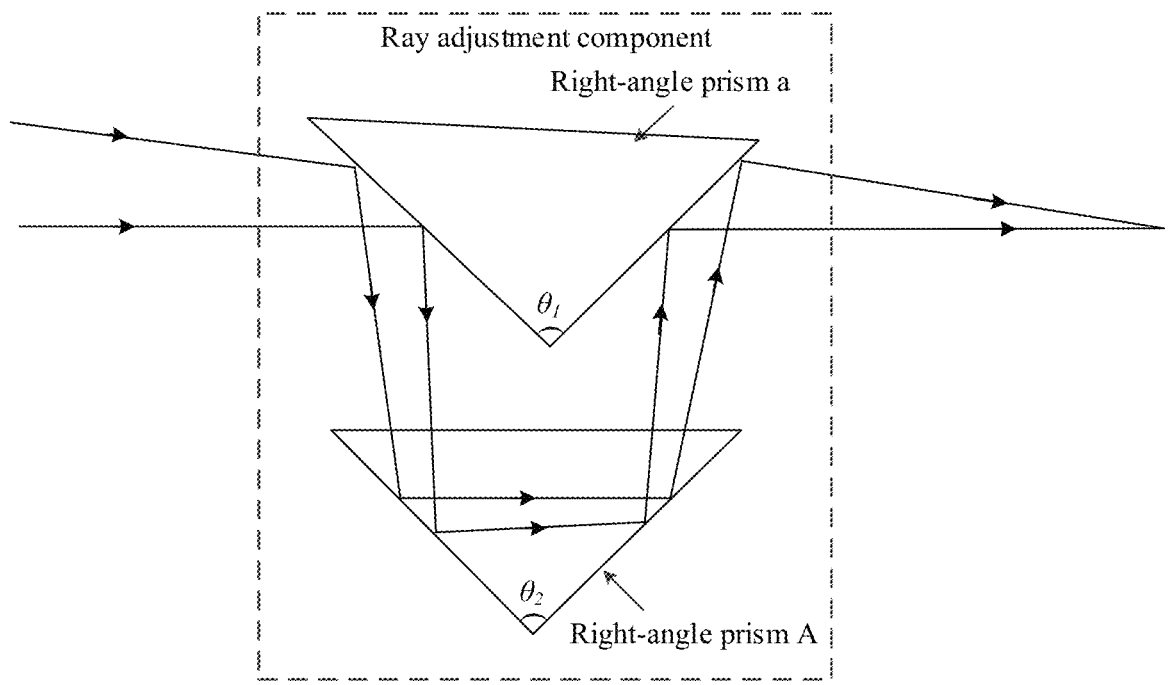
FIG. 7b is a schematic diagram depicting a structure of still another ray adjustment component according to an embodiment.

For example, M=2. FIG. 7b is a schematic diagram depicting a structure of still another ray adjustment component according to this application. The ray adjustment component includes two right-angle prisms: a right-angle prism a and a right-angle prism A. Two right-angle surfaces of the right-angle prism a may be referred to as first reflection surfaces. Two right-angle surfaces of the right-angle prism A may be referred to as second reflection surfaces. The two right-angle surfaces of the right-angle prism a are disposed opposite to the two right-angle surfaces of the right-angle prism A respectively.

Based on FIG. 7b, an included angle between the two right-angle surfaces of the night-angle prism a is $\theta_1$, where $\theta_1=90°$; an included angle between the two right-angle surfaces of the right-angle prism A is $\theta_2$, where $\theta_2=90°$.

Case 3: The M first reflection surfaces are reflection surfaces of M sequentially connected mirrors, and the M second reflection surfaces are reflection surfaces of M/2 sequentially connected right-angle prisms.

Figure 7C:
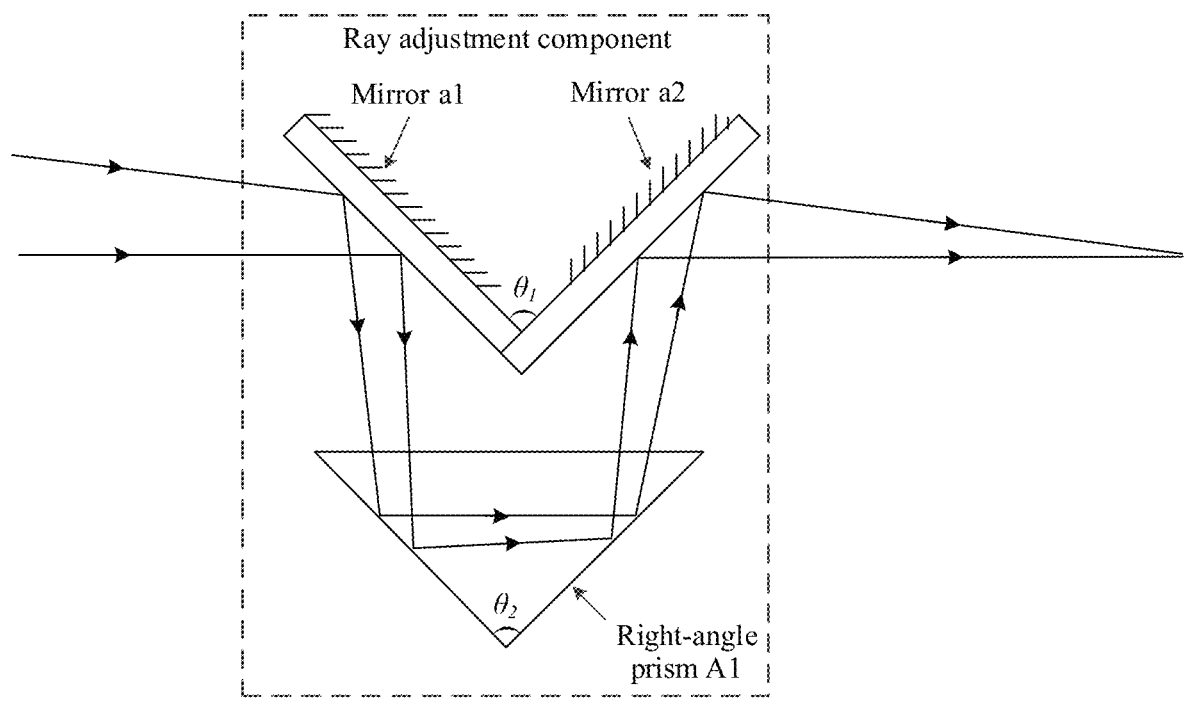
FIG. 7c is a schematic diagram depicting a structure of still another ray adjustment component according to an embodiment.

For example, M=2. FIG. 7c is a schematic diagram depicting a structure of still another ray adjustment component according to this application. The ray adjustment component includes two mirrors and one right-angle prism: a mirror a1, a mirror a2, and a right-angle prism A1. A reflection surface of the mirror a1 and a reflection surface of the mirror a2 are both referred to as first reflection surfaces, and the mirror a1 and the mirror a2 are sequentially connected. Two right-angle surfaces of the right-angle prism A1 are referred to as second reflection surfaces. The reflection surface of the mirror a1 and the reflection surface of the mirror a2 are disposed opposite to the two right-angle surfaces of the right-angle prism A1 respectively.

Based on FIG. 7c, an included angle between the mirror a1 and the mirror a2 is $\theta_1$, and an included angle between the two right-angle surfaces of the right-angle prism A is $\theta_2$, where $\theta_2=90°$.

Case 4: The M first reflection surfaces are reflection surfaces of M/2 sequentially connected right-angle prisms, and the M second reflection surfaces are reflection surfaces of M sequentially connected mirrors.

Figure 7D:
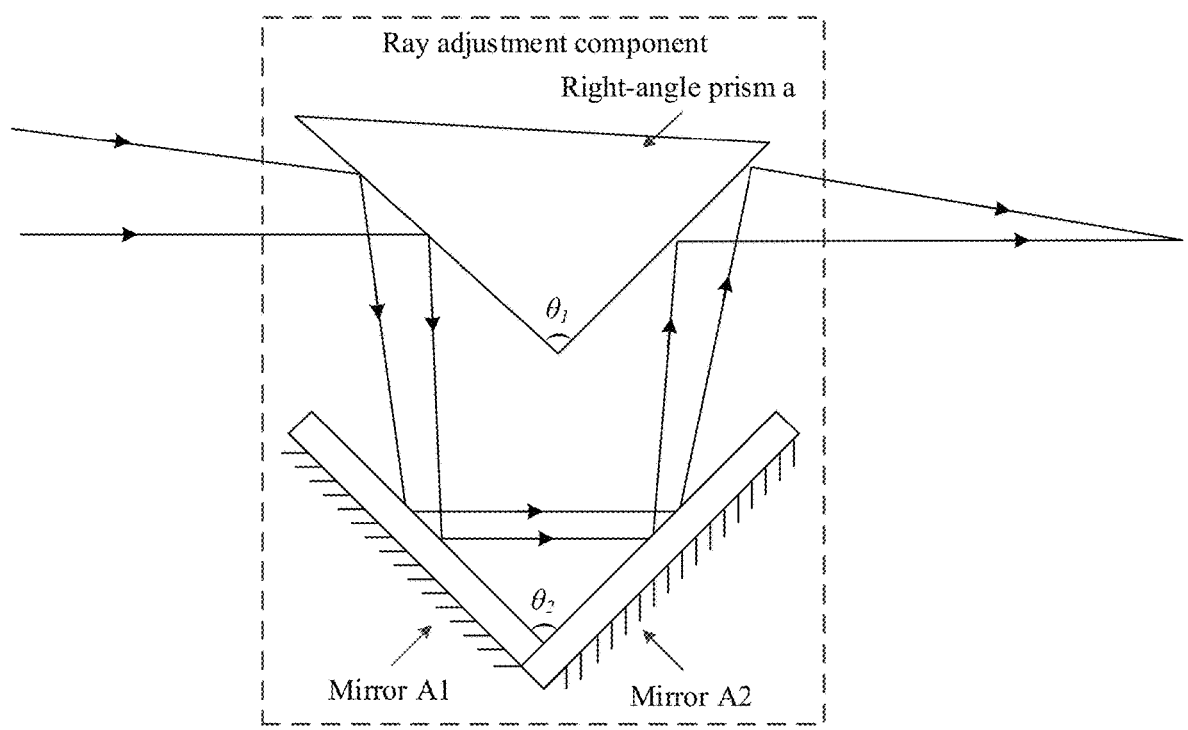
FIG. 7d is a schematic diagram depicting a structure of still another ray adjustment component according to an embodiment.

For example, M=2. FIG. 7d is a schematic diagram depicting a structure of still another ray adjustment component according to this application. The ray adjustment component includes one right-angle prism and two mirrors: a right-angle prism a1, a mirror A1, and a mirror A2. Two right-angle surfaces of the right-angle prism a1 are referred to as first reflection surfaces. A reflection surface of the mirror A1 and a reflection surface of the mirror A2 are both referred to as second reflection surfaces. The mirror A1 and the mirror A2 are sequentially connected. The two right-angle surfaces of the right-angle prism a1 are disposed opposite to the reflection surface of the mirror A1 and the reflection surface of the mirror A2 respectively.

Based on FIG. 7d, an included angle between the two right-angle surfaces of the right-angle prism a is $\theta_1$, $\theta_1=90°$, and an included angle between the mirror A1 and the mirror A2 is $\theta_2$.

Case 5: The M first reflection surfaces may be reflection surfaces of M/2 sequentially connected L-shaped mirrors, and the M second reflection surfaces may be reflection surfaces of M/2 sequentially connected right-angle prisms.

Figure 7E:
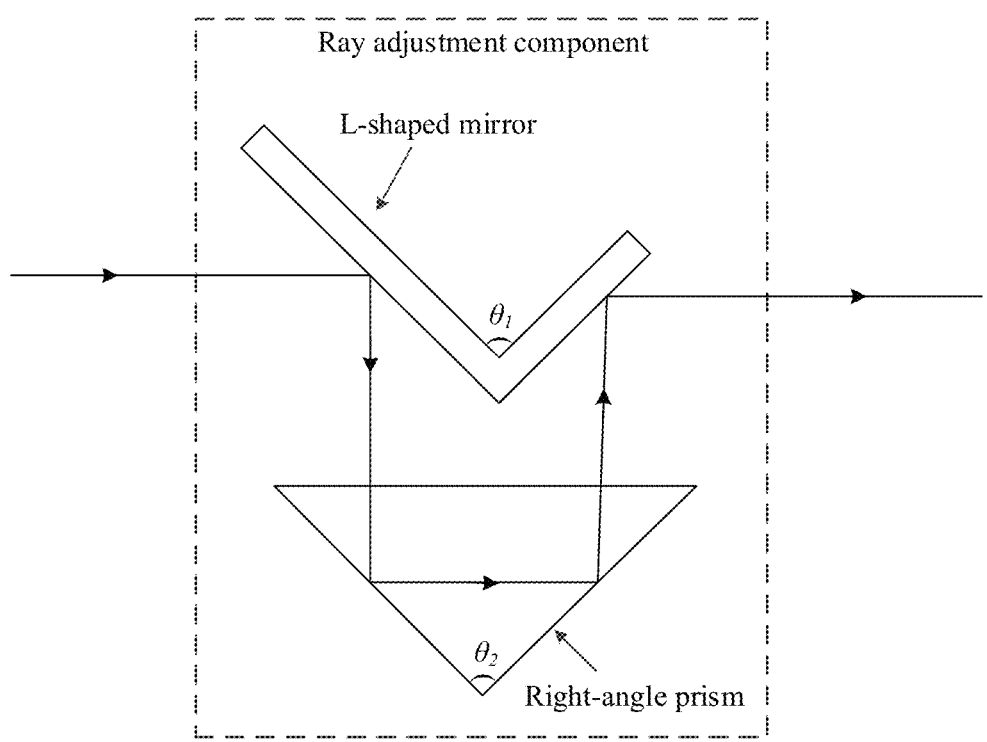
FIG. 7e is a schematic diagram depicting a structure of still another ray adjustment component according to an embodiment.

For example, M=2. FIG. 7e is a schematic diagram depicting a structure of still another ray adjustment component according to this application. The ray adjustment component includes one L-shaped mirror and one right-angle prism. Two reflection surfaces of the L-shaped mirror are two first reflection surfaces, and two right-angle surfaces of the right-angle prism are two second reflection surfaces. In other words, the two first reflection surfaces are two mutually perpendicular reflection surfaces of the L-shaped mirror, and the two second reflection surfaces are two mutually perpendicular reflection surfaces of the right-angle prism. The two reflection surfaces of the L-shaped mirror are parallel to and opposite to the two right-angle surfaces of the right-angle prism respectively.

Based on FIG. 7e, an included angle between the two reflection surfaces of the L-shaped mirror is $\theta_1$, where $\theta_1=90°$; an included angle between the two right-angle surfaces of the right-angle prism is $\theta_2$, where $\theta_2=90°$.

Case 6: The M first reflection surfaces are reflection surfaces of P mirrors and Q right-angle prisms that are sequentially connected, and the M second reflection surfaces are reflection surfaces of M sequentially connected mirrors, where P+2Q=M, and both P and Q are positive integers.

Figure 7F:
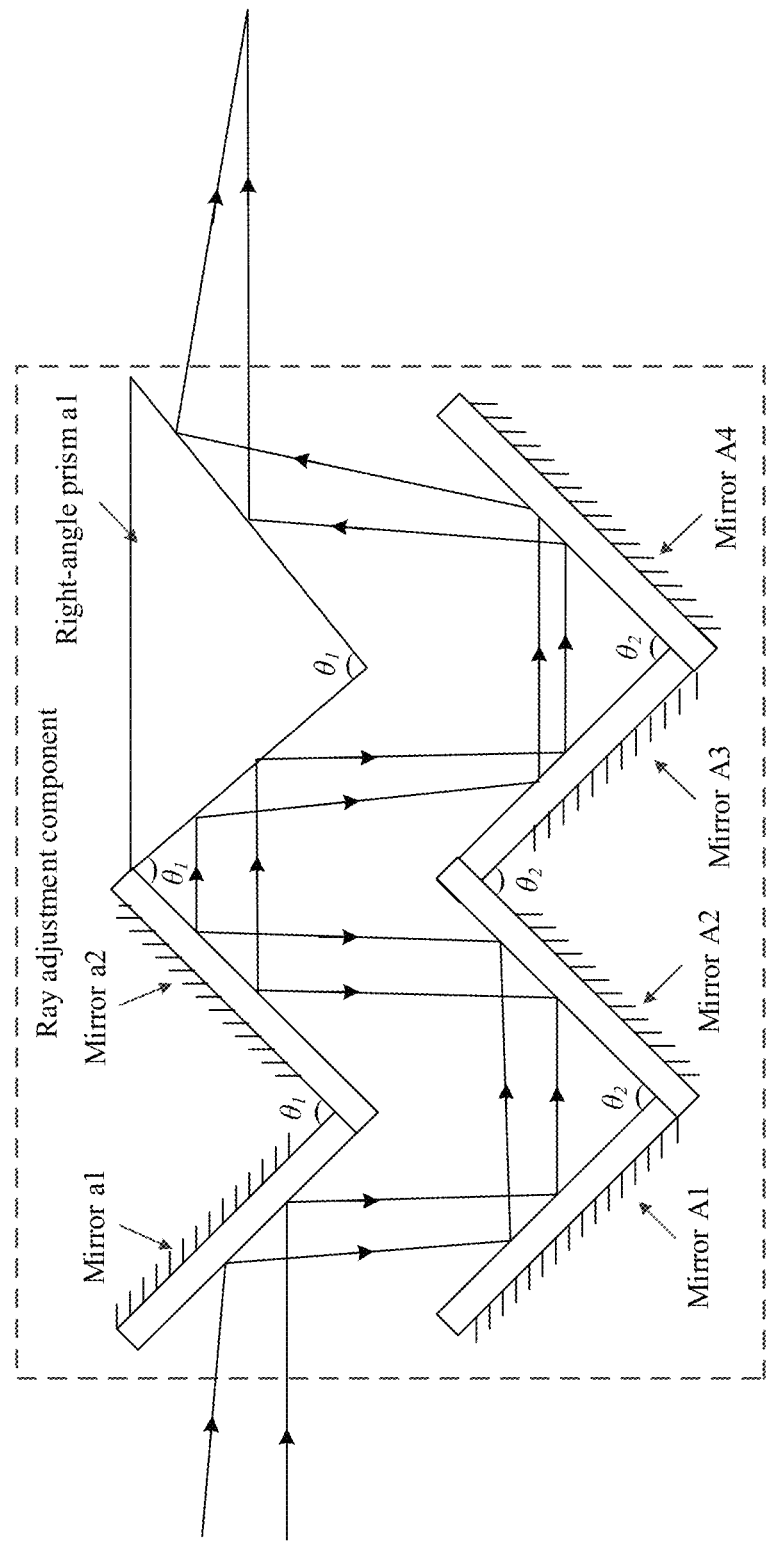
FIG. 7f is a schematic diagram depicting a structure of still another ray adjustment component according to an embodiment.

For example, M=4. FIG. 7f is a schematic diagram depicting a structure of still another ray adjustment component according to this application. The ray adjustment component includes six mirrors and one right-angle prism: a mirror a1, a mirror a2, a right-angle prism a1, a mirror A1, a mirror A2, a mirror A3, and a mirror A4. A reflection surface of the mirror a1, a reflection surface of the mirror a2, and two right-angle surfaces of the right-angle prism a1 are all referred to as first reflection surfaces. The mirror a1, the mirror a2, and the right-angle prism a1 are sequentially connected. A reflection surface of the mirror A1, a reflection surface of the mirror A2, a reflection surface of the mirror A3, and a reflection surface of the mirror A4 are all referred to as second reflection surfaces. The mirror A1, the mirror A2, the mirror A3, and the mirror A4 are sequentially connected. The reflection surface of the mirror a1 is disposed opposite to the reflection surface of the mirror A1, and the reflection surface of the mirror a2 is disposed opposite to the reflection surface of the mirror A2. The two right-angle surfaces of the right-angle prism a1 are disposed opposite to the mirror A3 and the mirror A4 respectively. It should be noted that P=2 and Q=1 in this example. In addition, in Case 6, the mirror a1 and the mirror a2 may alternatively be disposed behind the right-angle prism a1; or the mirror a1 is disposed in front of the right-angle prism a1, and the mirror a2 is disposed behind the right-angle prism a1.

Case 7: The M first reflection surfaces are reflection surfaces of P mirrors and Q right-angle prisms that are sequentially connected, and the M second reflection surfaces are reflection surfaces of M/2 sequentially connected right-angle prisms, where P+2Q=M, and both P and Q are positive integers.

Figure 7G:
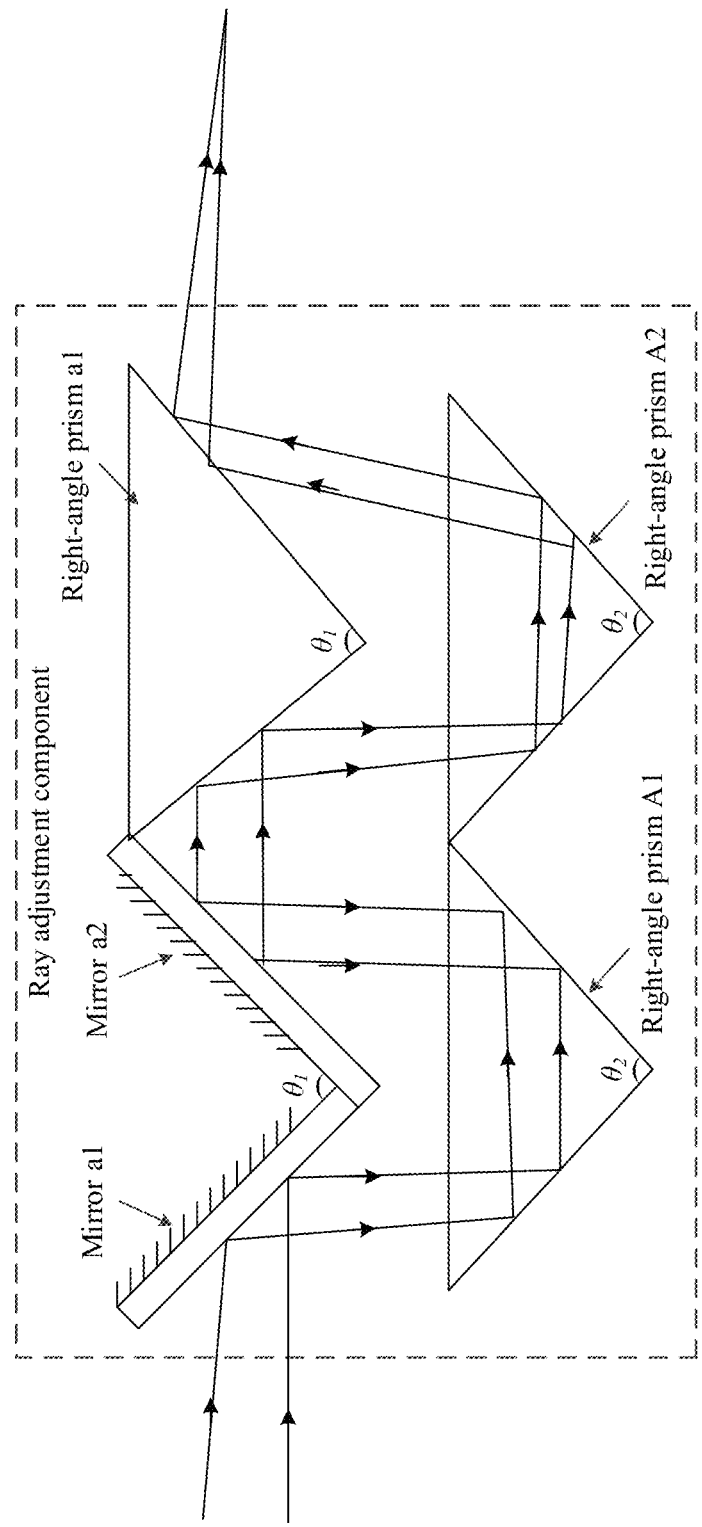
FIG. 7g is a schematic diagram depicting a structure of still another ray adjustment component according to an embodiment.

For example, M=4. FIG. 7g is a schematic diagram depicting a structure of still another ray adjustment component according to this application. The ray adjustment component includes two mirrors and three right-angle prisms: a mirror a1, a mirror a2, a right-angle prism a1, a right-angle prism A1, and a right-angle prism A2. A reflection surface of the mirror a1, a reflection surface of the mirror a2, and two right-angle surfaces of the right-angle prism a1 are all referred to as first reflection surfaces. The mirror a1, the mirror a2, and the right-angle prism a1 are sequentially connected. Two right-angle surfaces of the right-angle prism A1 and two right-angle surfaces of the right-angle prism A2 are all referred to as second reflection surfaces. The right-angle prism A1 and the right-angle prism A2 are sequentially connected. The reflection surface of the mirror a1 and the reflection surface of the mirror a2 are disposed opposite to the two right-angle surfaces of the right-angle prism A1 respectively. The two right-angle surfaces of the right-angle prism a1 are disposed opposite to the two right-angle surfaces of the right-angle prism A2 respectively. It should be noted that P=2 and Q=1 in this example. In addition, in Case 7, the mirror a1 and the mirror a2 may alternatively be disposed behind the right-angle prism a1; or the mirror a1 is disposed in front of the right-angle prism a1, and the mirror a2 is disposed behind the right-angle prism a1.

Case 8: The M first reflection surfaces are reflection surfaces of M sequentially connected mirrors, and the M second reflection surfaces are reflection surfaces of K mirrors and L right-angle prisms that are sequentially connected, where K+2L=M, and both K and L are integers greater than 0 and less than M.

Figure 7H:
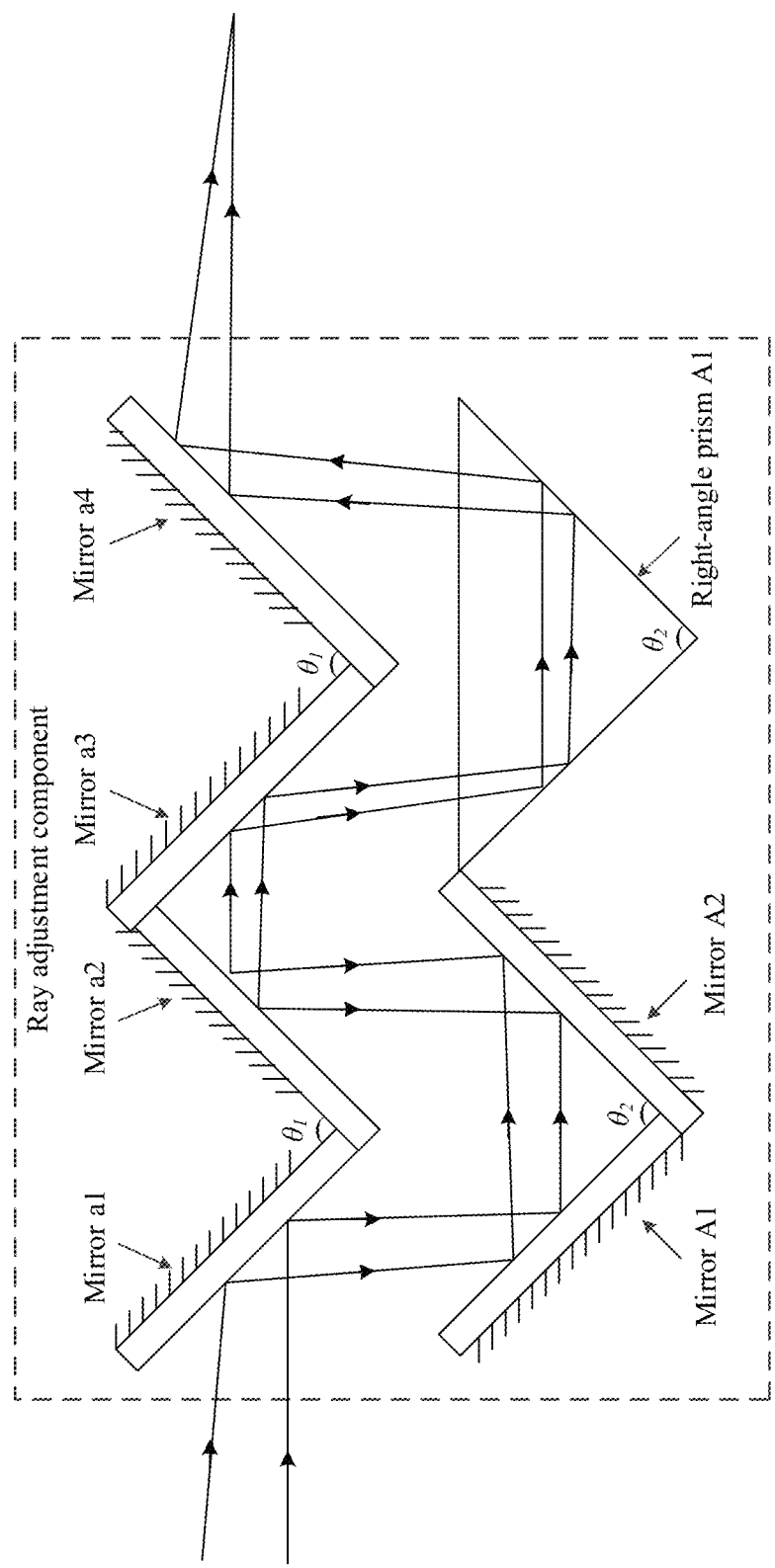
FIG. 7h is a schematic diagram depicting a structure of still another ray adjustment component according to an embodiment.

For example, M=4. FIG. 7h is a schematic diagram depicting a structure of still another ray adjustment component according to this application. The ray adjustment component includes six mirrors and one right-angle prism: a mirror a1, a mirror a2, a mirror a3, a mirror a4, a mirror A1, a mirror A2, and a right-angle prism A1. A reflection surface of the mirror a1, a reflection surface of the mirror a2, a reflection surface of the mirror a3, and a reflection surface of the mirror a4 are all referred to as first reflection surfaces. The mirror a1, the mirror a2, the mirror a3, and the mirror a4 are sequentially connected. A reflection surface of the mirror A1, a reflection surface of the mirror A2, and two right-angle surfaces of the right-angle prism A1 are all referred to as second reflection surfaces. The mirror A1, the mirror A2, and the right-angle prism A1 are sequentially connected. The reflection surface of the mirror a1 is disposed opposite to the reflection surface of the mirror A1, and the reflection surface of the mirror a2 is disposed opposite to the reflection surface of the mirror A2. The reflection surface of the mirror a3 and the reflection surface of the mirror a4 are disposed opposite to the two right-angle surfaces of the right-angle prism A1 respectively. It should be understood that K=2 and L=1 in this example. In addition, in Case 8, the mirror A1 and the mirror A2 may alternatively be disposed behind the right-angle prism A1; or the mirror A1 is disposed in front of the right-angle prism A1, and the mirror A2 is disposed behind the right-angle prism A1.

Case 9: The M first reflection surfaces are right-angle surfaces of M/2 sequentially connected right-angle prisms, and the M second reflection surfaces are reflection surfaces of K mirrors and L right-angle prisms that are sequentially connected, where K+2L=M, and both K and L are integers greater than 0 and less than M.

Figure 7I:
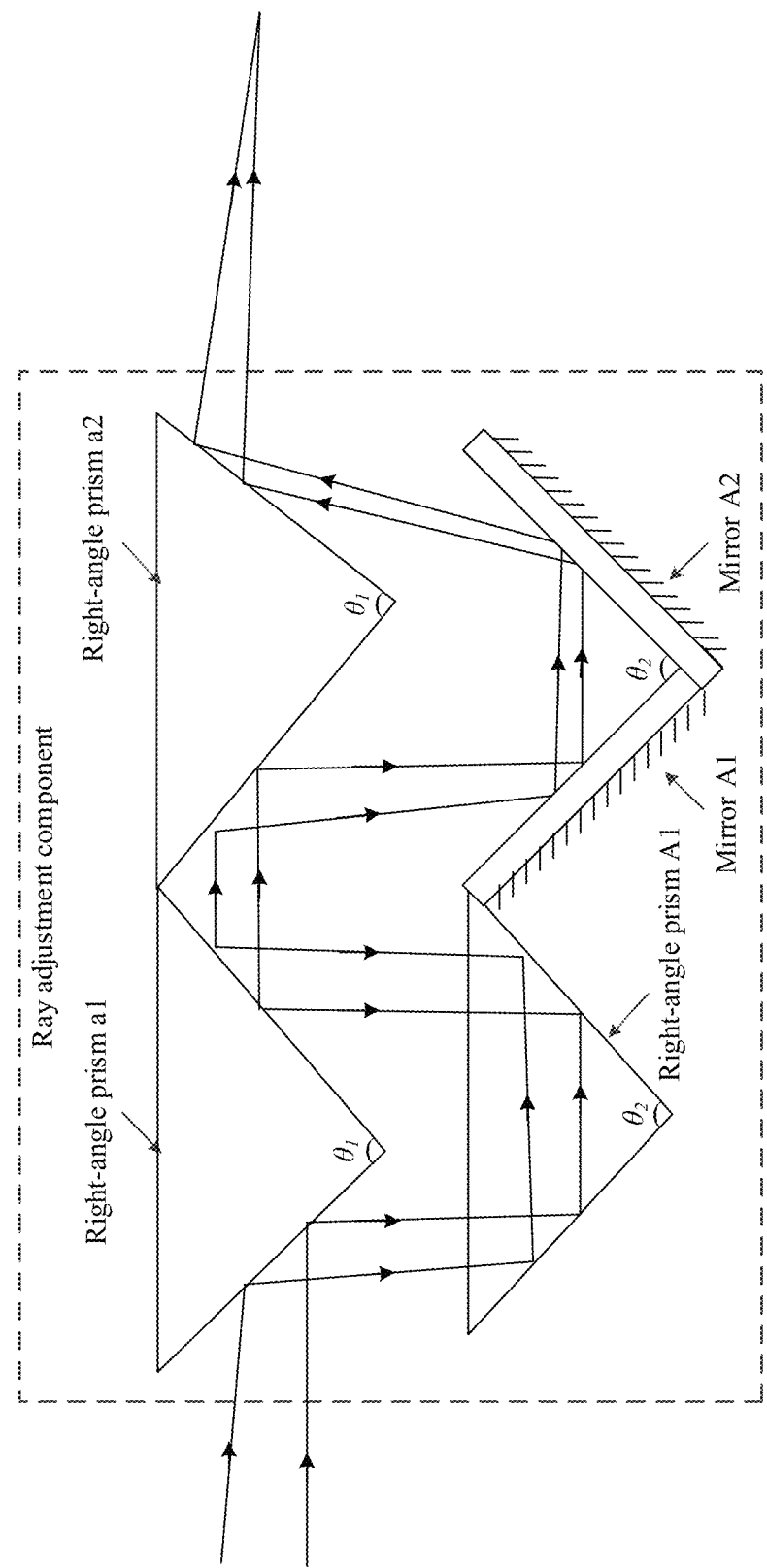
FIG. 7i is a schematic diagram depicting a structure of still another ray adjustment component according to an embodiment.

For example, M=4. FIG. 7i is a schematic diagram depicting a structure of still another ray adjustment component according to this application. The ray adjustment component includes three right-angle prisms and two mirrors: a right-angle prism a1, a right-angle prism a2, a right-angle prism A1, a mirror A1, and a mirror A2. Two right-angle surfaces of the right-angle prism a1 and two right-angle surfaces of the right-angle prism a2 are all referred to as first reflection surfaces. The right-angle prism a1 and the right-angle prism a2 are sequentially connected. Two right-angle surfaces of the right-angle prism A1, a reflection surface of the mirror A1, and a reflection surface of the mirror A2 are all referred to as second reflection surfaces. The right-angle prism A1, the mirror A1, and the mirror A2 are sequentially connected. The two right-angle surfaces of the right-angle prism a1 are disposed opposite to the reflection surface of the mirror A1 and the reflection surface of the mirror A2. The two right-angle surfaces of the right-angle prism a2 are disposed opposite to the two right-angle surfaces of the right-angle prism A2 respectively. It should be understood that K=2 and L=1 in this example. In addition, in Case 9, the mirror A1 and the mirror A2 may alternatively be disposed in front of behind the right-angle prism A1; or the mirror A1 is disposed in front of the right-angle prism A1, and the mirror A2 is disposed behind the right-angle prism A1.

Case 10: The M first reflection surfaces are reflection surfaces of P mirrors and Q right-angle prisms that are sequentially connected, and the M second reflection surfaces are reflection surfaces of K mirrors and L right-angle prisms that are sequentially connected, where P+Q=M, both P and Q are positive integers, K+2L=M, and both K and L are positive integers.

Figure 7J:
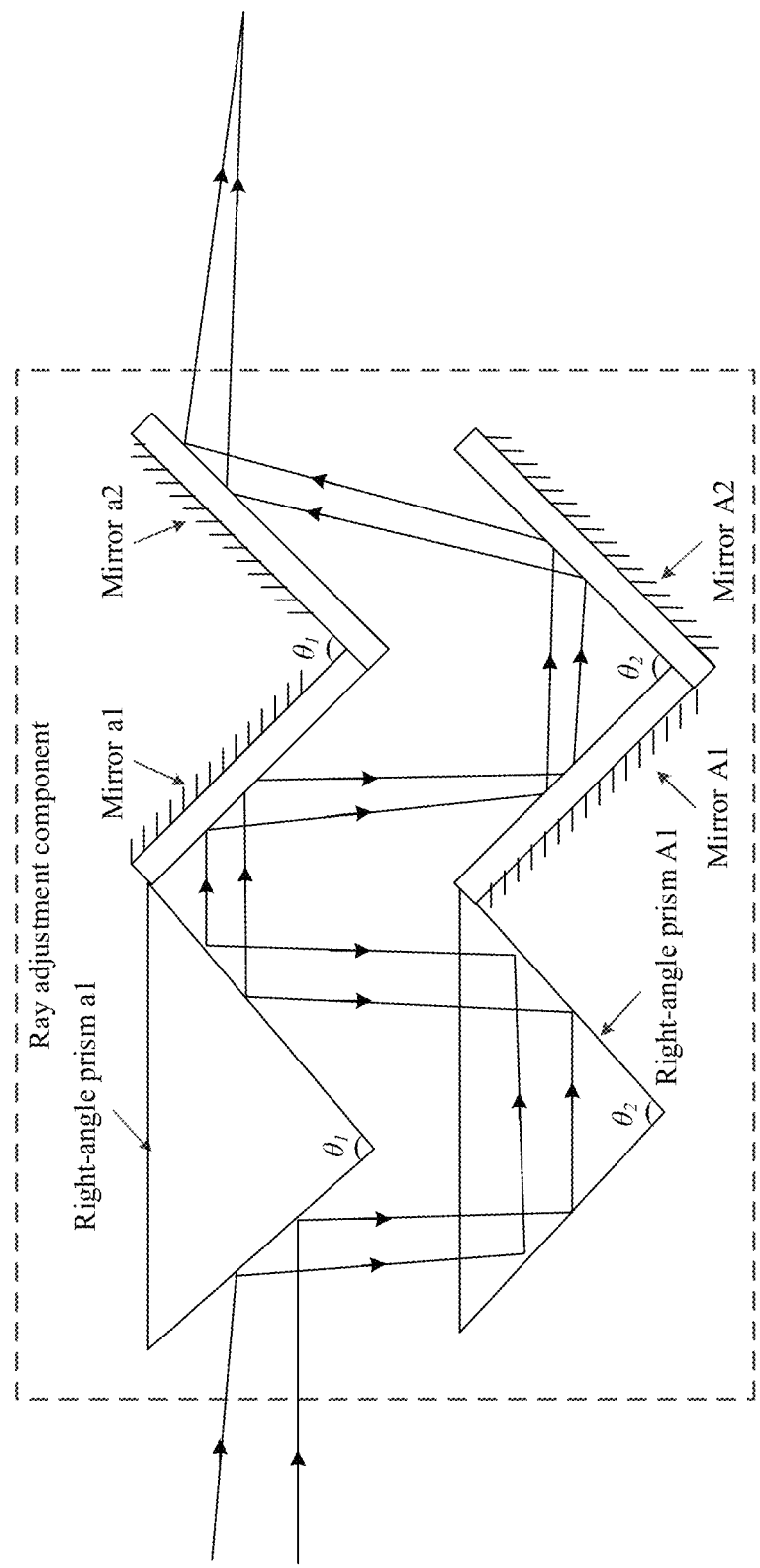
FIG. 7j is a schematic diagram depicting a structure of still another ray adjustment component according to an embodiment.

For example, M=4. FIG. 7j is a schematic diagram depicting a structure of still another ray adjustment component according to this application. The ray adjustment component includes two right-angle prisms and four mirrors: a right-angle prism a1, a mirror a1, a mirror a2, a right-angle prism A1, a mirror A1, and a mirror A2. Two right-angle surfaces of the right-angle prism a1, a reflection surface of the mirror a1, and a reflection surface of the mirror a2 are all referred to as first reflection surfaces. The right-angle prism a1, the mirror a1, and the mirror a2 are sequentially connected. Two right-angle surfaces of the right-angle prism A1, a reflection surface of the mirror A1, and a reflection surface of the mirror A2 are all referred to as second reflection surfaces. The right-angle prism A1, the mirror A1, and the mirror A2 are sequentially connected. The two right-angle surfaces of the right-angle prism a1 are disposed opposite to the two right-angle surfaces of the right-angle prism A1 respectively. The reflection surface of the mirror a1 is disposed opposite to the reflection surface of the mirror A1. The reflection surface of the mirror a2 is disposed opposite to the reflection surface of the mirror A2. It should be understood that P=2, Q=1, K=2, and L=1 in this example. In addition, in Case 10, the mirror A1 and the mirror A2 may alternatively be disposed in front of the right-angle prism A1; or the mirror A1 is disposed in front of the right-angle prism A1, and the mirror A2 is disposed behind the right-angle prism A1. In Case 10, the mirror a1 and the mirror a2 may alternatively be disposed in front of the right-angle prism a1; or the mirror a1 is disposed in front of the right-angle prism a1, and the mirror a2 is disposed behind the right-angle prism a1.

It should be noted that in the foregoing cases, any L-shaped mirror includes two reflection surfaces, and any right-angle prism includes two reflection surfaces. In addition, based on the foregoing possible structures of the first reflection surface and the second reflection surface, there may be other cases. For example, the M first reflection surfaces may be reflection surfaces of M/2 sequentially connected L-shaped mirrors, and the M second reflection surfaces may be reflection surfaces of M/2 sequentially connected L-shaped mirrors. For another example, the M second reflection surfaces may be reflection surfaces of M/2 sequentially connected L-shaped mirrors, and the M first reflection surfaces may be reflection surfaces of M/2 sequentially connected right-angle prisms. Other cases are not enumerated herein. In addition, when a right-angle surface of a right-angle prism is used as the first reflection surface, the right-angle prism may be a non-isosceles right-angle prism; or when a right-angle surface of a right-angle prism is used as the second reflection surface, the right-angle prism may be an isosceles right-angle prism.

It should be further noted that, in the foregoing Case 1 to Case 10, two adjacent mirrors may be fastened together through bonding or separated from each other, and two adjacent right-angle prisms may be fastened together through bonding or separated from each other. In addition, M=2 or M=4 is merely an example. M may be equal to 3, or M may be greater than 4.

Figure 7K:
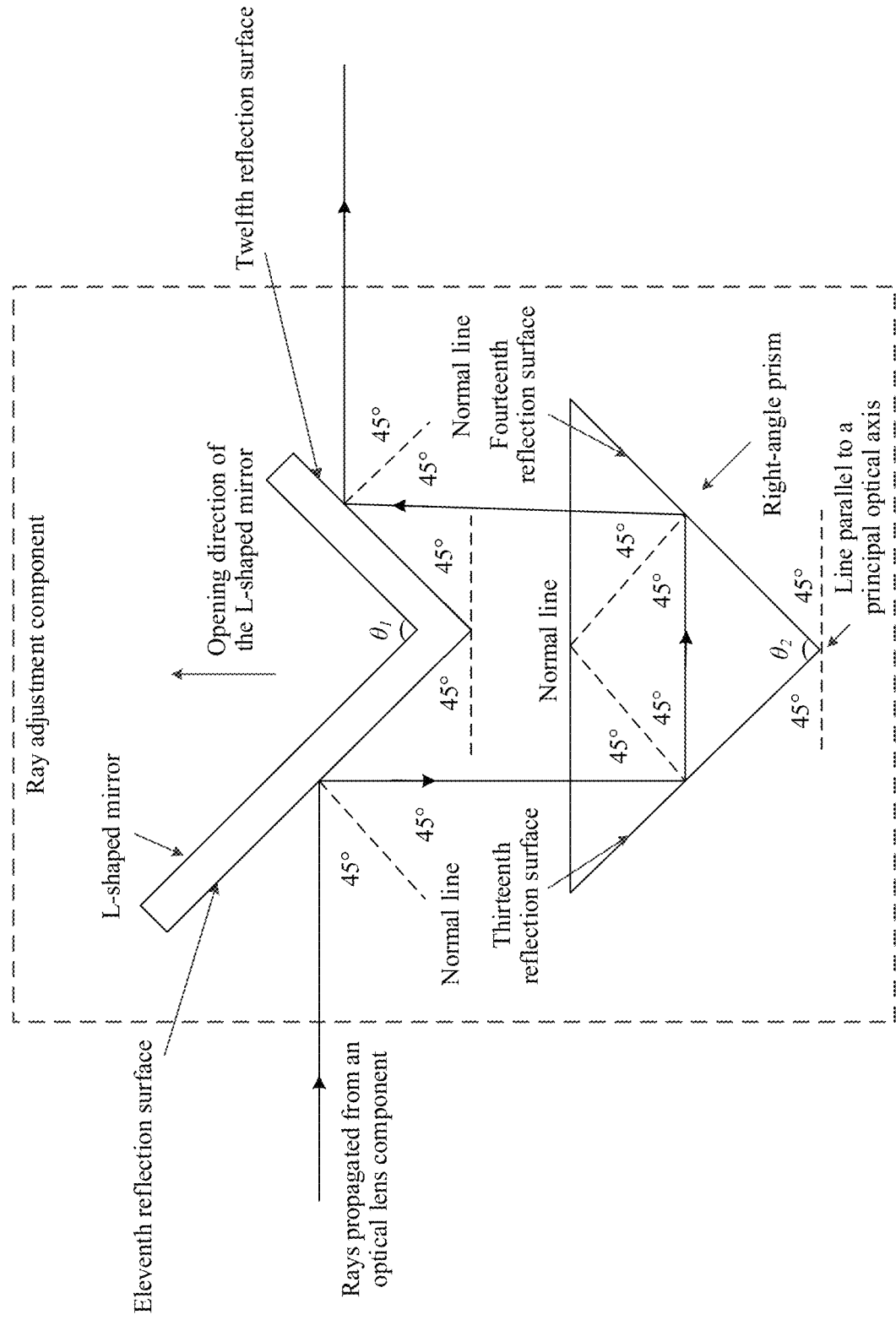
FIG. 7k is a schematic diagram depicting a structure of still another ray adjustment component according to an embodiment.

FIG. 7k is a schematic diagram depicting a structure of still another ray adjustment component according to this application. The ray adjustment component includes one L-shaped mirror and one right-angle prism. The L-shaped mirror includes an eleventh reflection surface and a twelfth reflection surface that are perpendicular to each other. The right-angle prism includes a thirteenth reflection surface and a fourteenth reflection surface that are perpendicular to each other. The eleventh reflection surface and the thirteenth reflection surface are disposed opposite and parallel to each other. The twelfth reflection surface and the fourteenth reflection surface are disposed opposite and parallel to each other. In this way, rays from the optical lens component are reflected to the image sensor after being sequentially reflected by the eleventh reflection surface, the thirteenth reflection surface, the fourteenth reflection surface, and the twelfth reflection surface.

Further, in an embodiment, FIG. 7k uses an example in which rays from the optical lens component enter the eleventh reflection surface of the L-shaped mirror at an incident angle of 45 degrees. The rays from the optical lens component enter the eleventh reflection surface of the L-shaped mirror at the incident angle of 45 degrees. A reflection angle of the rays reflected from the eleventh reflection surface is also 45 degrees. The rays reflected from the eleventh reflection surface enter the thirteenth reflection surface of the right-angle prism at an incident angle of 45 degrees. A reflection angle of the rays reflected from the thirteenth reflection surface of the right-angle prism is also 45 degrees. The rays reflected from the thirteenth reflection surface of the right-angle prism enter the fourteenth reflection surface of the right-angle prism at an incident angle of 45 degrees. A reflection angle of the rays reflected from the fourteenth reflection surface of the right-angle prism is also 45 degrees. The rays reflected from the fourteenth reflection surface of the right-angle prism enter the twelfth reflection surface of the L-shaped mirror at an incident angle of 45 degrees. A reflection angle of the rays reflected from the twelfth reflection surface of the L-shaped mirror is 45 degrees. In other words, when the rays from the optical lens component enter the eleventh reflection surface of the L-shaped mirror at an incident angle of 45 degrees, the rays reflected to the image sensor by the twelfth reflection surface of the L-shaped mirror are parallel to a direction of a principal optical axis.

In an embodiment, an included angle between the eleventh reflection surface of the L-shaped mirror and the principal optical axis is 45 degrees, and an included angle between the twelfth reflection surface of the L-shaped mirror and the principal optical axis is 45 degrees. Because the first included angle between the eleventh reflection surface and the principal optical axis is equal to an included angle between the eleventh reflection surface and a line parallel to the principal optical axis, the included angle between the eleventh reflection surface and the line parallel to the principal optical axis is used to represent the included angle between the eleventh reflection surface and the principal optical axis in FIG. 7k for ease of drawing. Similarly, an included angle between the twelfth reflection surface and a line parallel to the principal optical axis is used to represent the included angle between the twelfth reflection surface and the principal optical axis.

In an embodiment, an included angle between the thirteenth reflection surface of the right-angle prism and the principal optical axis is 45 degrees, and an included angle between the fourteenth reflection surface of the right-angle prism and the principal optical axis is 45 degrees. Because the included angle between the thirteenth reflection surface and the principal optical axis is equal to an included angle between the thirteenth reflection surface and the line parallel to the principal optical axis, the included angle between the thirteenth reflection surface and the line parallel to the principal optical axis is used to represent the included angle between the thirteenth reflection surface and the principal optical axis in FIG. 7k for ease of drawing. Similarly, an included angle between the fourteenth reflection surface and the line parallel to the principal optical axis is used to represent the included angle between the fourteenth reflection surface and the principal optical axis.

In an embodiment, an opening direction of the L-shaped mirror is the same as an opening direction of a right angle of the right-angle prism.

It should be noted that FIG. 7k is merely a schematic diagram, and the rays from the optical lens component enter the eleventh reflection surface at an incident angle including but not limited to 45 degrees. In addition, the included angle between the principal optical axis and each of the eleventh reflection surface, the twelfth reflection surface, the thirteenth reflection surface, and the fourteenth reflection surface includes but is not limited to 45 degrees. In other words, positions of disposing the L-shaped mirror and the right-angle prism are not limited in this application.

It should be further noted that the eleventh reflection surface and the twelfth reflection surface of the L-shaped mirror shown in FIG. 7k may be the two first reflection surfaces of the L-shaped mirror shown in FIG. 7e, and the thirteenth reflection surface and the fourteenth reflection surface of the right-angle prism shown in FIG. 7k may be the two second reflection surfaces of the right-angle prism shown in FIG. 7e. Therefore, for movement of the ray adjustment component shown in FIG. 7e that is driven by the first actuator, refer to descriptions in which the first actuator drives the first reflection surface and the second reflection surface. Details are not described herein again.

3. Actuator

In an embodiment, the first actuator is configured to drive the M first reflection surfaces to move along a first direction, and/or drive the M second reflection surfaces to move along a second direction. The first direction is opposite to the second direction, and both the first direction and the second direction are directions perpendicular to the principal optical axis. Further, optionally, the first actuator is configured to drive the M first reflection surfaces to move along the first direction as an entirety; or drive the M second reflection surfaces to move along the second direction as an entirety; or drive the M first reflection surfaces to move along the first direction as an entirety, and drive the M second reflection surfaces to move along the second direction. In this way, focusing of rays at different object distances can be implemented. This can ensure that a clear image can be formed on the image sensor. In addition, the first actuator drives the M first reflection surfaces and/or the M second reflection surfaces of the ray adjustment component to move to implement focusing, without a need to move the optical lens component. Therefore, the optical lens component does not need to be coupled to the first actuator.

It should be noted that a value of 61 does not change because the M first reflection surfaces are moved along the first direction as an entirety, and that a value of 62 does not change because the M second reflection surfaces are also moved along the second direction as an entirety. In addition, if the first direction is upward, the second direction is downward; if the first direction is downward, the second direction is upward.

With reference to FIG. 5a, a distance between two first reflection surfaces and two second reflection surfaces may be increased in the following three manners. Manner 1: The two second reflection surfaces are not moved, and the first actuator is configured to drive the two first reflection surfaces to move upward as an entirety. Manner 2: The two first reflection surfaces are not moved, and the first actuator is configured to drive the two second reflection surfaces to move downward as an entirety. Manner 3: The first actuator is configured to drive the two first reflection surfaces to move upward as an entirety, and drive the two second reflection surfaces to move downward as an entirety.

With reference to FIG. 5a, a distance between two first reflection surfaces and two second reflection surfaces may be decreased in the following three manners. Manner a: The two second reflection surfaces are not moved, and the first actuator is configured to drive the two first reflection surfaces to move downward as an entirety. Manner b: The two first reflection surfaces are not moved, and the first actuator is configured to drive the two second reflection surfaces to move upward as an entirety. Manner c: The first actuator is configured to drive the two first reflection surfaces to move downward as an entirety, and drive the two second reflection surfaces to move upward as an entirety.

Figure 8:
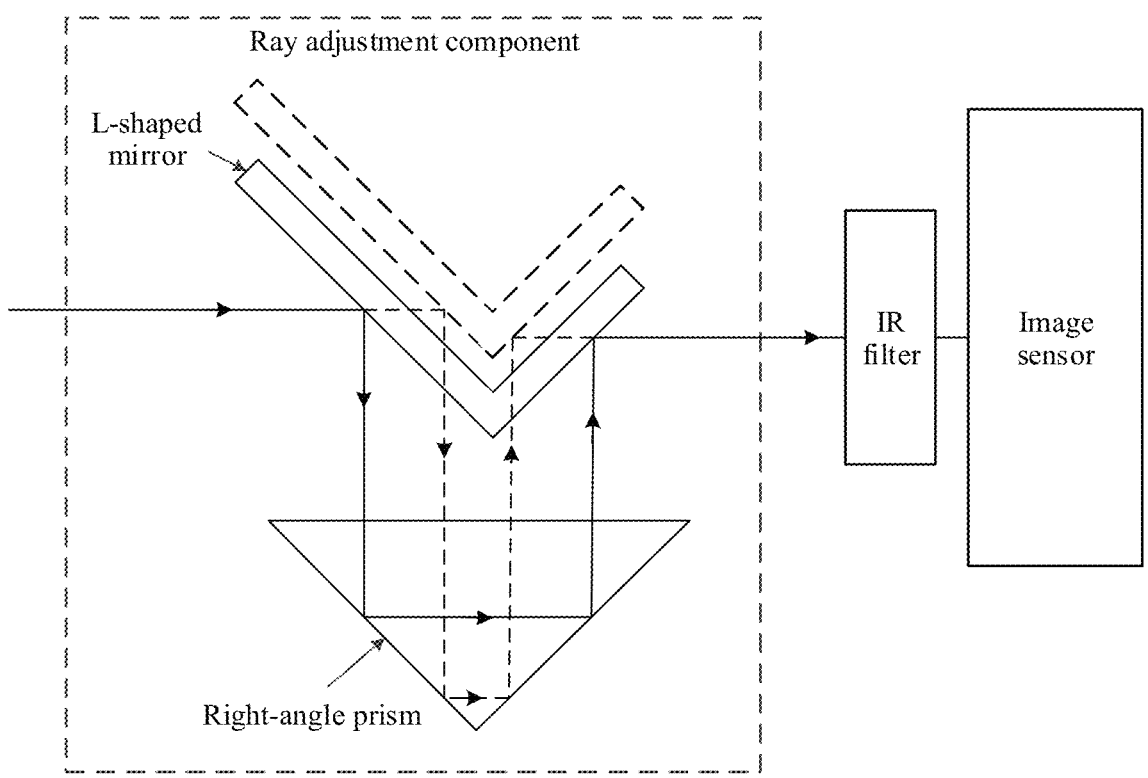
FIG. 8 is a schematic diagram of optical paths presented before and after an actuator drives an L-shaped mirror to move according to an embodiment.

In an embodiment, the first actuator may be configured to drive the M first reflection surfaces to move along a direction perpendicular to the principal optical axis. With reference to the structure of the ray adjustment component shown in FIG. 7e, an example is used in which the M second reflection surfaces are not moved and the first actuator drives the M first reflection surfaces to move. FIG. 8 is a schematic diagram of optical paths presented before and after an actuator drives an L-shaped mirror to move according to this application. With reference to FIG. 7e, the L-shaped mirror and the right-angle prism may perform four times of bending on the rays propagated from the optical lens component, to fold the optical path of the rays. Solid lines may represent a folded optical path, of rays, presented when the first actuator does not drive the L-shaped mirror to move. Dashed lines may represent a folded optical path, of rays, presented after the first actuator drives the L-shaped mirror to move upward. The first actuator drives the L-shaped mirror to move, so that focusing of rays can be implemented. In addition, because the L-shaped mirror has a smaller size than the right-angle prism, focusing is implemented by driving the L-shaped mirror to move. This helps reduce power consumption of the first actuator.

With reference to FIG. 7e or FIG. 7k, in an embodiment, the first actuator may be configured to drive the L-shaped mirror to move along a first direction, and/or drive the right-angle prism to move along a second direction. The first direction is opposite to the second direction, and both the first direction and the second direction are directions perpendicular to the principal optical axis. It should be noted that, for an embodiment in which the first actuator may be configured to drive the L-shaped mirror to move along the first direction and/or drive the right-angle prism to move along the second direction, refer to the foregoing descriptions in which the first actuator is configured to drive the M first reflection surfaces to move along the first direction and/or drive the M second reflection surfaces to move along the second direction. Details are not described herein again.

With reference to FIG. 7e or FIG. 7k, in an embodiment, the first actuator is configured to drive the L-shaped mirror to move along the direction perpendicular to the principal optical axis. For this possible implementation, refer to the descriptions in which the first actuator may be configured to drive the M first reflection surfaces to move along the direction perpendicular to the principal optical axis. Details are not described herein again.

In an embodiment, the first actuator may be further configured to drive the M first reflection surfaces and/or the M second reflection surfaces to move along a third direction, to perform optical image stabilization on the rays from the optical lens component. The third direction is a direction parallel to the principal optical axis. It should be understood that the third direction may be a leftward direction or a rightward direction (refer to directions shown in FIG. 5a). In this way, the ray adjustment component can not only fold the optical path of the rays propagated from the optical lens component, but also perform optical image stabilization on the rays in a specific direction (namely, the third direction).

With reference to FIG. 5a, optical image stabilization may be performed on the rays from the optical lens component in any one of the following manners. The two second reflection surfaces are not moved, and the first actuator may be further configured to drive the two first reflection surfaces to move leftward as an entirety. Alternatively, the two first reflection surfaces are not moved, and the first actuator may be further configured to drive the two second reflection surfaces to move leftward as an entirety. Alternatively, the first actuator may be further configured to drive the two first reflection surfaces to move leftward as an entirety, and drive the two second reflection surfaces to move leftward as an entirety. Alternatively, the two second reflection surfaces are not moved, and the first actuator may be further configured to drive the two first reflection surfaces to move rightward as an entirety. Alternatively, the two first reflection surfaces are not moved, and the first actuator may be further configured to drive the two second reflection surfaces to move rightward as an entirety. Alternatively, the first actuator may be further configured to drive the two first reflection surfaces to move rightward as an entirety, and drive the two second reflection surfaces to move rightward as an entirety.

Further, in an embodiment, the first actuator is configured to drive the M first reflection surfaces and/or the M second reflection surfaces to move along the third direction by a distance less than a preset distance. The preset distance is a smallest value in a first projection distance set and a second projection distance set. The first projection distance set includes projection distances of lengths of all the M first reflection surfaces in a direction of the principal optical axis. The second projection distance set includes projection distances of lengths of all the M second reflection surfaces in the direction of the principal optical axis.

With reference to FIG. 5b, the first projection distance set=$\{L_{aa}, L_{bb}\}$, the second projection distance set=$\{L_{AA}, L_{BB}\}$, and the preset distance is a smallest value in $\{L_{aa}, L_{bb}, L_{AA}, L_{BB}\}$.

In an embodiment, the first actuator may be a focusing motor, a servo motor, or the like.

With reference to FIG. 7e or FIG. 7k, in an embodiment, the first actuator is further configured to drive the L-shaped mirror and/or the right-angle prism to move along a third direction, to perform optical image stabilization on the rays from the optical lens component. The third direction is a direction parallel to the principal optical axis. It should be noted that, for descriptions in which the first actuator is further configured to drive the L-shaped mirror and/or the right-angle prism to move along the third direction, refer to descriptions of the possible implementation in which the first actuator drives the M first reflection surfaces and/or the M second reflection surfaces to move along the third direction. Details are not described herein again. Further, optionally, the first actuator is configured to drive the L-shaped mirror and/or the right-angle prism to move along the third direction by a distance less than a preset distance. It should be noted that, for descriptions of the preset distance, refer to the foregoing related descriptions. Details are not described herein again.

In an embodiment, the first actuator may be fastened together with the M first reflection surfaces and/or the M second reflection surfaces. If the M first reflection surfaces are reflection surfaces of M/2 sequentially connected L-shaped mirrors, the first actuator may be fastened together with the M/2 sequentially connected L-shaped mirrors. If the M first reflection surfaces are reflection surfaces of M sequentially connected mirrors, the first actuator may be fastened together with the M mirrors. If the M first reflection surfaces are reflection surfaces of M/2 sequentially connected right-angle prisms, the first actuator may be fastened together with the M/2 right-angle prisms. If the M first reflection surfaces are reflection surfaces of P mirrors and Q right-angle prisms that are sequentially connected, the first actuator may be fastened together with the P mirrors and the Q right-angle prisms. For a manner of fastening the second actuator and the second reflection surface together, refer to the manner of fastening the first actuator and the first reflection surface together. Details are not described herein again.

With reference to FIG. 7a, the first actuator may be fastened together with the M first mirrors and/or the M second mirrors. With reference to FIG. 7e or FIG. 7k, the first actuator may be fastened together with the L-shaped mirror and/or the right-angle prism.

In an embodiment, the first actuator may also be configured to drive the optical lens component to move, so that the rays whose optical path is folded are focused on the image sensor. In other words, focusing of the rays whose optical path is folded may be implemented by the first actuator by driving the optical lens component to move, or implemented by the first actuator by driving the ray adjustment component to move.

Further, in an embodiment, the first actuator is configured to drive the optical lens component to move along a direction parallel to the principal optical axis. With reference to FIG. 4a, the first actuator may be configured to drive the first lens element and the second lens element in the optical lens component to move as an entirety along the direction parallel to the principal optical axis; or the first lens element is not moved, and the second lens element is moved along the direction parallel to the principal optical axis; or the second lens element is not moved, and the first lens element is moved along the direction parallel to the principal optical axis.

It should be noted that the eleventh reflection surface and the twelfth reflection surface may be understood as two first reflection surfaces described above, and the thirteenth reflection surface and the fourteenth reflection surface may be understood as two second reflection surfaces described above. In some examples, for a manner in which the first actuator drives the eleventh reflection surface and/or the twelfth reflection surface, refer to the foregoing manner in which the first actuator drives the first reflection surface; for a manner in which the first actuator drives the thirteenth reflection surface and/or the fourteenth reflection surface, refer to the foregoing manner in which the first actuator drives the second reflection surface. Details are not described herein again.

4. Image Sensor

In an embodiment, the image sensor may include a photosensitive element and a related circuit, for example, a photosensitive chip. In an embodiment, the photosensitive element may be a photoelectric detector (PD), a high-speed photodiode, a charge-coupled device (CCD), or a complementary metal-oxide-semiconductor (CMOS) phototransistor.

In an embodiment, the image sensor receives rays from the ray adjustment component, where an optical path of the rays is folded and the rays are focused; and converts the received rays into an electrical signal for imaging. It should be noted that information carried by the focused rays whose optical path is folded is the same as information carried by rays from a photographed object. In addition, the rays focused on the image sensor are all rays propagated from the optical lens component, and a light spot, on the image sensor, generated from rays in a non-focusing area may be large.

Further, in an embodiment, the image sensor may perform processing on an obtained image, such as denoising, enhancement, and segmentation blurring, to enrich user experience.

In an embodiment, a range of resolution of the image sensor may be [8, 48] (unit: megapixel). For example, the resolution of the image sensor may be 8 megapixels, 12 megapixels, 20 megapixels, 48 megapixels, or the like. Further, optionally, the resolution of the image sensor may be greater than 48 megapixels, for example, 52 megapixels, 60 megapixels, or 72 megapixels. Resolution may refer to a maximum quantity of pixels (namely, photosensitive units) that can be used for imaging on the image sensor in the compact camera module. Generally, the resolution is measured by a product of a quantity of horizontal pixels and a quantity of vertical pixels, that is, Resolution=Quantity of horizontal pixels×Quantity of vertical pixels.

In an embodiment, the compact camera module may further include an optical image stabilization component. Based on the optical image stabilization component and the first actuator that drives the M first reflection surfaces and/or the M second reflection surfaces to move along the third direction, an image stabilization angle can be increased. For example, the optical image stabilization component can implement optical image stabilization by 0.1 degree, and the first actuator may drive the M first reflection surfaces and/or the M second reflection surfaces to move along the third direction to implement optical image stabilization by 0.1 degree. This combination can implement optical image stabilization by 0.2 degree.

Figure 9:
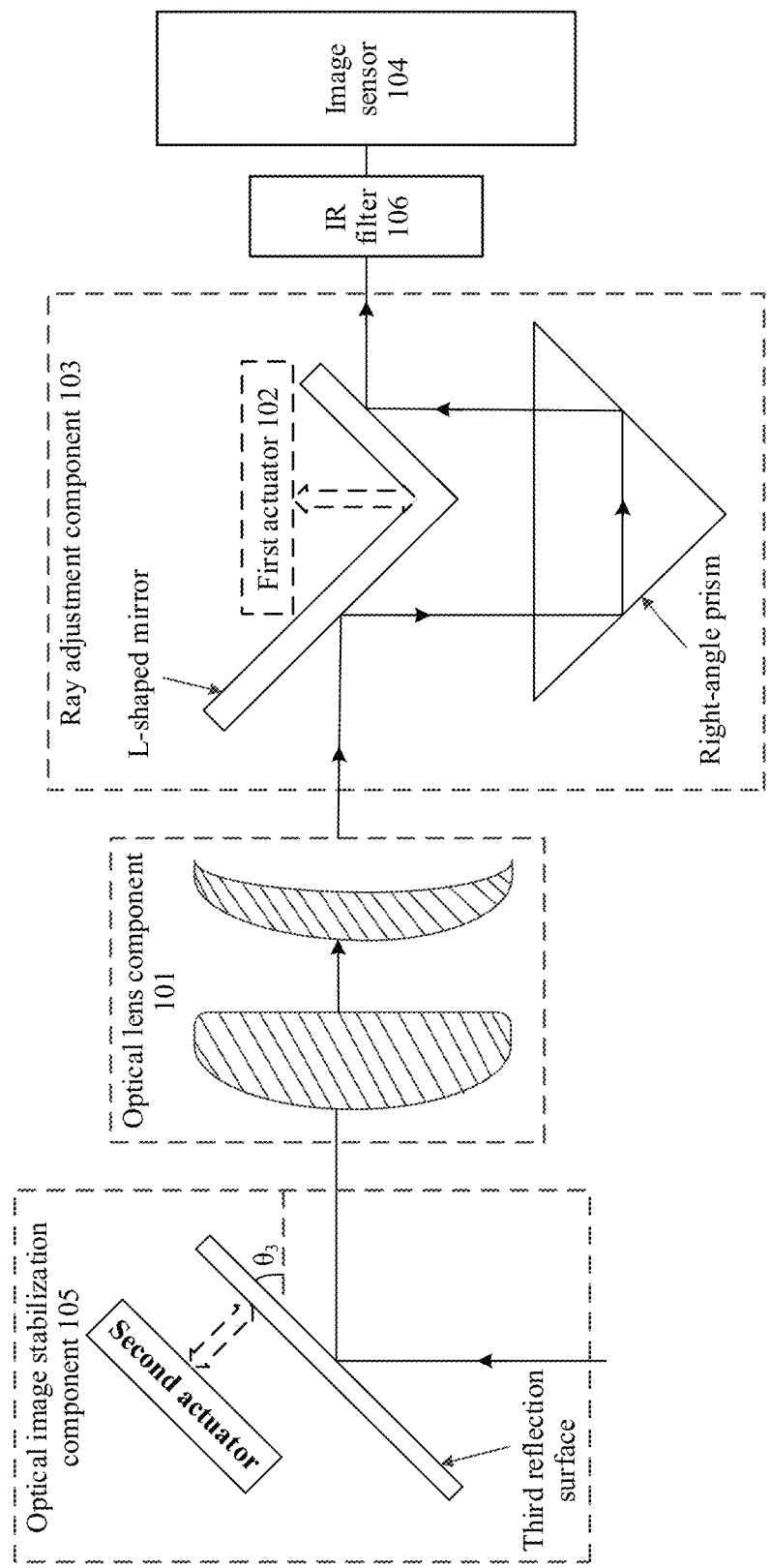
FIG. 9 is a schematic diagram depicting a structure of another compact camera module according to an embodiment.

FIG. 9 is a schematic diagram depicting a structure of another compact camera module according to this application. The compact camera module includes an optical lens component 101, a first actuator 102, a ray adjustment component 103, an image sensor 104, and an optical image stabilization component 105. The optical lens component 101 is located between the optical image stabilization component 105 and the ray adjustment component 103. The optical image stabilization component 105 includes a second actuator and a third reflection surface. The third reflection surface is configured to receive rays from a photographed object. The second actuator is configured to drive the third reflection surface to rotate, to perform optical image stabilization on the rays from the photographed object, and emit rays obtained through optical image stabilization into the optical lens component. For descriptions of the optical lens component 101, the first actuator 102, the ray adjustment component 103, and the image sensor 104, refer to the foregoing content. Details are not described herein again. It should be understood that the ray adjustment component is the ray adjustment component described in Case 5, the first actuator and the L-shaped mirror are movably fastened together, and the optical lens component is the optical lens component shown in FIG. 4a in this example.

It should be noted that the rays obtained after the optical image stabilization component performs optical image stabilization on the rays from the photographed object may also be referred to as rays from the photographed object. In addition, information carried by the rays propagated from the optical lens component is the same as information carried by the rays entering the optical lens component.

Further, in an embodiment, the second actuator may be configured to drive the third reflection surface to rotate along at least one of three mutually perpendicular directions (for example, XYZ). For example, the second actuator may be configured to drive the third reflection surface to tilt at a small angle along a direction of a principal optical axis, that is, change a value of $\theta_3$, where a change in the value of $\theta_3$ is less than an angle threshold (for example, 0.10). In this way, optical image stabilization can be performed in the direction of the principal optical axis.

In an embodiment, an included angle between the third reflection surface and the principal optical axis is $\theta_3$, where $\theta_3$ is greater than 0 degrees and less than 90 degrees. Further, optionally, $\theta_3$ is greater than or equal to 30 degrees and less than or equal to 60 degrees. For example, $\theta_3$ may be 30 degrees, 45 degrees, or 60 degrees.

In an embodiment, the third reflection surface may be a reflection surface of a right-angle prism (for example, a hypotenuse surface of an isosceles right-angle prism) or a reflection surface of a mirror.

In an embodiment, the second actuator may alternatively be an optical image stabilization motor, a servo motor, or the like. It should be noted that the first actuator and the second actuator may be integrated together, or may be two separate actuators. This is not limited in this application.

Certainly, the compact camera module may further include other components, for example, a shake detector and a processor, where the shake detector may be a gyroscope. The shake detector may be configured to detect a slight movement, and transmit a signal of the detected slight movement to the processor. The processor calculates an amount of required compensation based on the slight movement, and then controls, based on the calculated amount of compensation, the second actuator to drive the third reflection surface to adjust a position and an angle.

Further, in an embodiment, the compact camera module may further include an infrared radiation (infrared radiation, IR) filter 106 (refer to FIG. 9). The IR filter may be configured to block or absorb rays of a specific wavelength. For example, the IR filter blocks infrared radiation that damages or adversely affects the image sensor, and can be configured not to affect a focal length of the optical lens component. Optionally, the IR filter may be made of glass or a glass-like resin, for example, blue glass. In an embodiment, the IR filter may be located between the image sensor and the ray adjustment component (refer to FIG. 8).

Based on the foregoing described structure and function principle of the compact camera module, this application may further provide a terminal device. The terminal device may include a first camera, a memory, and a processor. The first camera includes the foregoing compact camera module. The memory is configured to store a program or instructions. The processor is configured to invoke the program or the instructions to control the first camera to obtain a first image.

In an embodiment, the first camera may be a fixed-focus camera, a magnification of the first camera is A1, and a value range of A1 is (5, 12]. Further, optionally, the value range of A1 is [8, 12]. For example, A1 may be 5, 8, or 10.

Further, in an embodiment, the terminal device may further include a second camera, the second camera is also a fixed-focus camera, a magnification of the second camera is A2, and A2 is greater than 1 and less than A1. For example, a value range of A2 is (1, 3]. For example, A2 may be 2 or 3.

Further, in an embodiment, the terminal device may further include a wide-angle camera, and the wide-angle camera is also a fixed-focus camera. A magnification of the wide-angle camera is A3. A3 is usually less than 1, that is, a value range of A3 may be (0, 1). Further, optionally, the value range of A3 may be [0.6, 0.9]. For example, A3 may be 0.3, 0.6, 0.8, or 0.9.

In an embodiment, the terminal device may further include a main camera, and a zoom ratio of the main camera is 1.

It may be understood that the terminal device may further include other components, for example, a wireless communication apparatus, a sensor, a touchscreen, and a display.

In an embodiment, the terminal device may be a personal computer, a server computer, a handheld device or a laptop device, a mobile device (for example, a cellphone, a mobile phone, a tablet computer, a wearable device (for example, a smartwatch), a personal digital assistant, or a media player), a consumer electronic device, a small-sized computer, a mainframe computer, a film camera, a digital camera, a video camera, a surveillance device, a telescope, or a periscope.

Figure 10:
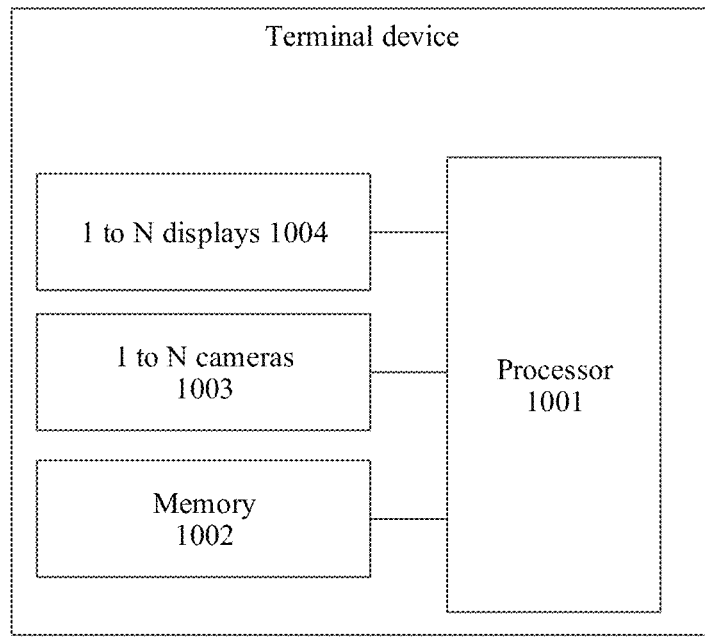
FIG. 10 is a schematic diagram depicting a structure of a terminal device according to an embodiment.

FIG. 10 is a schematic diagram depicting a structure of a terminal device according to this application. The terminal device may include a processor 1001, a memory 1002, a camera 1003, a display 1004, and the like. It should be understood that the hardware structure shown in FIG. 10 is merely an example. The terminal device applicable to this application may include more or fewer components than the terminal device shown in FIG. 10, may combine two or more components, or may have different component configurations. The components shown in FIG. 10 may be implemented on hardware including one or more signal processors and/or application-specific integrated circuits, software, or a combination of hardware and software.

The processor 1001 may include one or more processing units. For example, the processor 1001 may include an application processor (application processor, AP) 1001, a graphics processing unit (graphics processing unit, GPU) 1001, an image signal processor (image signal processor, ISP) 1001, a controller, a digital signal processor (digital signal processor, DSP) 1001, and the like. Different processing units may be independent components, or may be integrated into one or more processors 1001.

The camera 1003 may be configured to capture dynamic and static images and the like. In some embodiments, the terminal device may include one or N cameras 1003, where N is an integer greater than 1. For example, the terminal device may include a front-facing camera and a rear-facing camera. In an embodiment, the terminal device may include two rear-facing cameras, for example, a main camera and a first camera. Alternatively, the terminal device may include three rear-facing cameras, for example, a main camera, a wide-angle camera, and a first camera. Alternatively, the terminal device may include four rear-facing cameras, for example, a main camera, a wide-angle camera, a first camera, and a second camera. Alternatively, the terminal device may include five rear-facing cameras, for example, a main camera, a wide-angle camera, a first camera, a second camera, and a depth camera (for example, a time of flight (ToF) compact camera module). The first camera may be referred to as a high ratio telephoto lens, and the second camera may be referred to as a low ratio telephoto lens. A zoom ratio of the main camera is 1. For zoom ratios of the first camera, the second camera, and the wide-angle camera, refer to the foregoing descriptions. Details are not described herein again. It should be understood that a quantity of rear-facing cameras may alternatively be greater than 5. This is not limited in this application. In addition, a quantity and a type of front-facing cameras are not limited in this application.

The display 1004 may be configured to display images, videos, and the like. The display 1004 may include a display panel. The display panel may be a liquid crystal display (LCD) 1004, an organic light-emitting diode (OLED), an active-matrix organic light-emitting diode (AMOLED), a flexible light-emitting diode (FLED), a mini LED, a micro LED, a micro OLED, a quantum dot light-emitting diode (QLED), or the like. In some embodiments, the terminal device may include one or H displays 1004, where H is a positive integer greater than 1. For example, the terminal device may implement a display function by using a GPU, the display 1004, the application processor 1001, and the like.

Based on the foregoing content and the same concept, this application provides an imaging method. Refer to the descriptions in FIG. 11. The imaging method may be applied to the terminal device shown in FIG. 10. The terminal device may include a first camera. The first camera may include the compact camera module in any one of the foregoing embodiments in FIG. 3 to FIG. 9, and the compact camera module may include a ray adjustment component. The ray adjustment component is configured to fold an optical path of rays.

Figure 11:
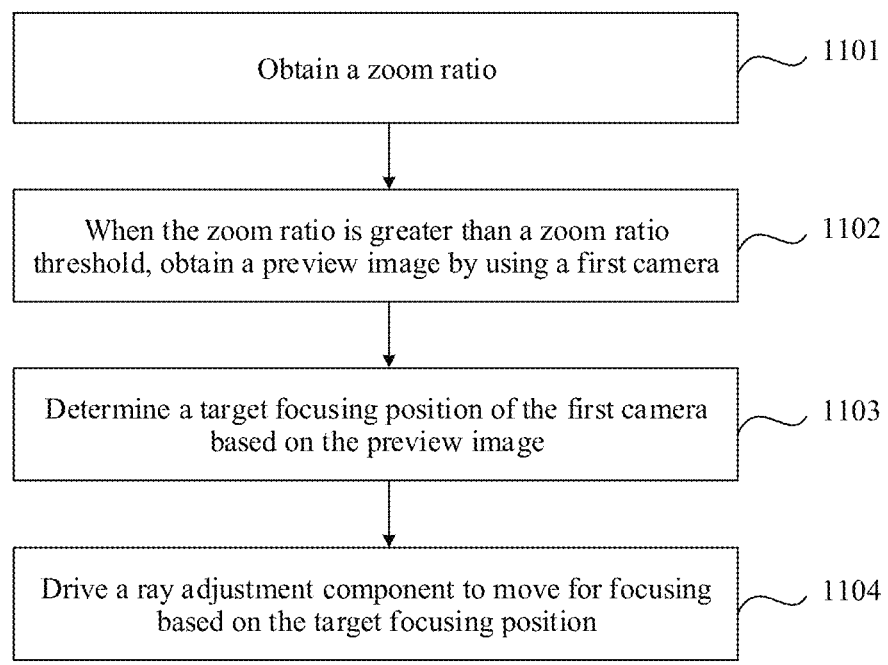
FIG. 11 is a schematic flowchart of an imaging method according to an embodiment.

As shown in FIG. 11, the imaging method includes the following operations.

Operation 1101: Obtain a zoom ratio.

Herein, the zoom ratio may be a default zoom ratio of the terminal device in some shooting modes (for example, a portrait mode or a long-focus mode), or may be a zoom ratio that is selected by a user on the terminal device.

Operation 1102: When the zoom ratio is greater than a zoom ratio threshold, obtain a preview image by using the first camera.

Herein, a value range of the zoom ratio threshold may be [5, 11). For example, the zoom ratio threshold may be 5, 6, 8, or the like.

In an embodiment, when the zoom ratio is greater than or equal to 10.0, the preview image may be obtained by using the first camera.

Operation 1103: Determine a target focusing position of the first camera based on the preview image.

The following describes two example implementations of determining the target focusing position of the first camera, where the target focusing position is a position in which a clear first image can be generated.

Implementation 1: Determine the target focusing position based on a central area of the preview image.

Implementation 2: Receive a focusing operation performed by a user on the preview image, and determine a focusing position in response to the focusing operation as the target focusing position.

Operation 1104: Drive the ray adjustment component to move for focusing based on the target focusing position.

Herein, the target position of the ray adjustment component may first be determined based on the target focusing position, and then the ray adjustment component is driven to move based on the target position. It should be noted that driving the ray adjustment component to move for focusing can implement focusing of rays.

In an embodiment, the target focusing position may be first determined based on the preview image, the target position of the ray adjustment component is calculated based on the target focusing position, and the ray adjustment component is driven to move to the target position.

In another embodiment, the ray adjustment component is moved based on the preview image to obtain multiple frames of images, a position, of the ray adjustment component, corresponding to a frame of clearest image in the multiple frames of images is determined as the target position of the ray adjustment component, and then the ray adjustment component is driven to move to the target position.

In an embodiment, the ray adjustment component may include M first reflection surfaces and M second reflection surfaces. Based on the target focusing position, the M first reflection surfaces may be driven to move along a first direction, and/or the M second reflection surfaces may be driven to move along a second direction, to move to the target focusing position, for focusing of rays whose optical path is folded. The first direction is opposite to the second direction, and both the first direction and the second direction are directions perpendicular to a principal optical axis.

In another embodiment, the ray adjustment component may include M first reflection surfaces and M second reflection surfaces, and may drive, based on the target focusing position, the M first reflection surfaces to move along a direction perpendicular to the principal optical axis to move to the target focusing position, to implement focusing of rays whose optical path is folded.

It can be learned from operation 1101 to operation 1104 that, the ray adjustment component folds the optical path of the rays propagated from an optical lens component, so that an optical path for imaging can be shortened, and a size of the compact camera module can be reduced. When the compact camera module is integrated into a terminal device with limited space, an optical lens component with a long physical focal length may be used, so that a high optical zoom ratio can be implemented. Further, the ray adjustment component is driven to move based on the zoom ratio, so that the rays whose optical path is folded are focused, and a clear image can be formed. It should be noted that an image that is finally obtained by using the first camera may be referred to as a first image.

To implement optical image stabilization, in an embodiment, the M first reflection surfaces and/or the M second reflection surfaces may further be driven to move along a third direction based on detected shake information, to perform optical image stabilization on the rays from the optical lens component. The third direction is parallel to the direction of the principal optical axis.

In an embodiment, the terminal device may further include a second camera, and the second camera is a fixed-focus camera. When the zoom ratio is greater than 1 and less than or equal to the zoom ratio threshold, the second camera may obtain a second image. A magnification of the second camera is A2, and A2 is greater than 1 and less than A1.

In this application, the terminal device further includes a wide-angle camera. When the zoom ratio is greater than 0 and less than 1, the wide-angle camera may obtain a third image.

It should be noted that, for detailed descriptions of the functional components of the compact camera module included in the first camera in the foregoing imaging method, refer to descriptions of the foregoing related content. Details are not described herein again.

The following describes a possible photographing method by using the following example: A terminal device includes a first camera, a second camera, a third camera, and a main camera, a zoom ratio A1 of the first camera is 10, a zoom ratio A2 of the second camera is 3, and the third camera is a wide-angle camera. For descriptions of possible implementations of the first camera, the second camera, the third camera, and the main camera, refer to the foregoing related descriptions. Details are not described herein again.

When a zoom ratio is within [0.6, 0.9], the terminal device may select the wide-angle camera (namely, the third camera) for photographing. In other words, when the zoom ratio is within [0.6, 0.9], the terminal device may select the wide-angle camera (namely, the third camera) to obtain a third image. Further, optionally, when the terminal device selects the wide-angle camera (namely, the third camera) for photographing, the third image may be obtained based on image signal processor (ISP) processing and wide-angle digital zoom (DZ) algorithm processing. The ISP processing may include but not be limited to multi-frame fusion. The DZ algorithm may include but not be limited to a common interpolation algorithm and a single-frame super-resolution algorithm.

When a zoom ratio is within [1.0, 2.9], the terminal device may select the main camera for photographing. In other words, when the zoom ratio is within [1.0, 2.9], the terminal device may select the main camera to obtain a fourth image. Further, optionally, when selecting the main camera for photographing, the terminal device may obtain the fourth image based on ISP processing and wide-angle DZ algorithm processing. For descriptions of ISP processing and wide-angle DZ algorithm processing, refer to the foregoing related descriptions. Details are not described herein again.

When a zoom ratio is within [3.0, 6.9], the terminal device may select a camera whose zoom ratio is 3 for photographing, that is, the terminal device may select the second camera for photographing. In other words, when the zoom ratio is within [3.0, 6.9], the terminal device may obtain a second image by using the second camera whose zoom ratio is 3. Further, optionally, when selecting the second camera for photographing, the terminal device may obtain the second image based on ISP processing, wide-angle DZ algorithm processing, and other processing. For descriptions of ISP processing and DZ algorithm processing, refer to the foregoing related descriptions. Details are not described herein again.

When a zoom ratio is within [7.0, 9.9], the terminal device may select a camera whose zoom ratio is 10 and a camera whose zoom ratio is 3 for photographing. In other words, when the zoom ratio is within [7.0, 9.9], the terminal device may obtain a fifth image by using the first camera whose zoom ratio is 10 and the second camera whose zoom ratio is 3. Further, optionally, when selecting the second camera and the first camera for photographing, the terminal device may obtain the fifth image based on ISP processing, wide-angle DZ algorithm processing, and field of view (FoV) fusion processing. For ISP processing and DZ algorithm processing, refer to the foregoing related descriptions. Details are not described herein again.

When a zoom ratio is greater than or equal to 10.0, the terminal device may select a camera whose zoom ratio is 10 for photographing. In other words, when the zoom ratio is greater than or equal to 10.0, the terminal device may obtain the first image by using the first camera whose zoom ratio is 10. Further, optionally, when selecting the first camera for photographing, the terminal device may obtain the first image based on ISP processing, DZ algorithm processing, and misalignment blur recovery algorithm processing. The misalignment blur recovery algorithm may include but not be limited to deblurring processing. It should be understood that misalignment blur is a special kind of blur.

It can be understood that the imaging apparatus includes corresponding hardware structures and/or software modules to perform the functions in the foregoing method embodiments. A person of ordinary skill in the art should easily be aware that, in combination with the modules and the method operations in the examples described in the embodiments disclosed in this application, this application can be implemented by hardware or a combination of hardware and computer software. Whether a function is performed by hardware or hardware driven by computer software depends on particular application scenarios and design constraints of the technical solutions.

Figure 12:
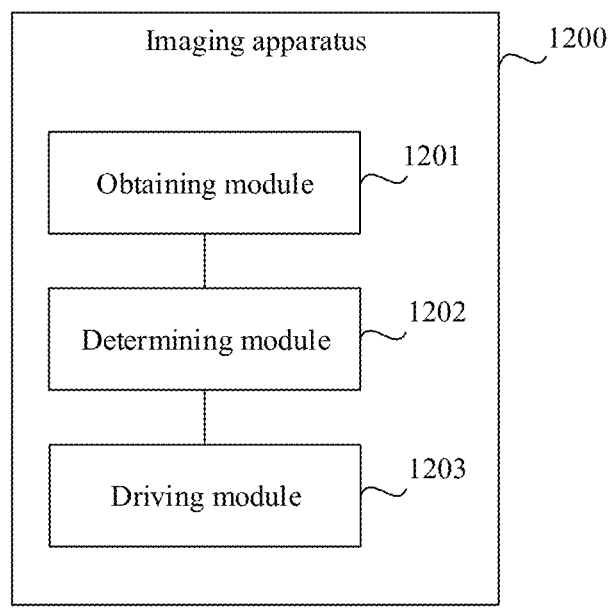
FIG. 12 is a schematic diagram depicting a structure of an imaging apparatus according to an embodiment.

FIG. 12 is a schematic diagram depicting a structure of a possible imaging apparatus according to this application. The imaging apparatus may be configured to implement functions of the foregoing method embodiments, and therefore can implement beneficial effects of the foregoing method embodiments. In this application, the imaging apparatus may be used in a terminal device shown in FIG. 10. The terminal device includes a first camera, the first camera includes a ray adjustment component, and the ray adjustment component is configured to fold an optical path of rays obtained by the first camera.

As shown in FIG. 12, the imaging apparatus 1200 includes an obtaining module 1201, a determining module 1202, and a driving module 1203. The imaging apparatus 1200 is configured to implement functions in the method embodiment shown in FIG. 11.

When the imaging apparatus 1200 is configured to implement the functions in the method embodiment shown in FIG. 11, the obtaining module 1201 is configured to obtain a zoom ratio; and when the zoom ratio is greater than a zoom ratio threshold, obtain a preview image by using the first camera. The determining module 1202 is configured to determine a target focusing position of the first camera based on the preview image. The driving module 1203 is configured to drive the ray adjustment component to move for focusing based on the target focusing position.

For more detailed descriptions of the obtaining module 1201, refer to related descriptions in operation 1101 and operation 1102 shown in FIG. 11. For more detailed descriptions of the determining module 1202, refer to related descriptions in operation 1103 shown in FIG. 11. For more detailed descriptions of the driving module 1203, refer to related descriptions in operation 1104 shown in FIG. 11. In addition, for more detailed descriptions of the first camera, refer to related descriptions of the first camera shown in FIG. 10. For more detailed descriptions of the compact camera module, refer to related descriptions of the compact camera modules shown in FIG. 3 to FIG. 9. Details are not described herein again.

Figure 13:
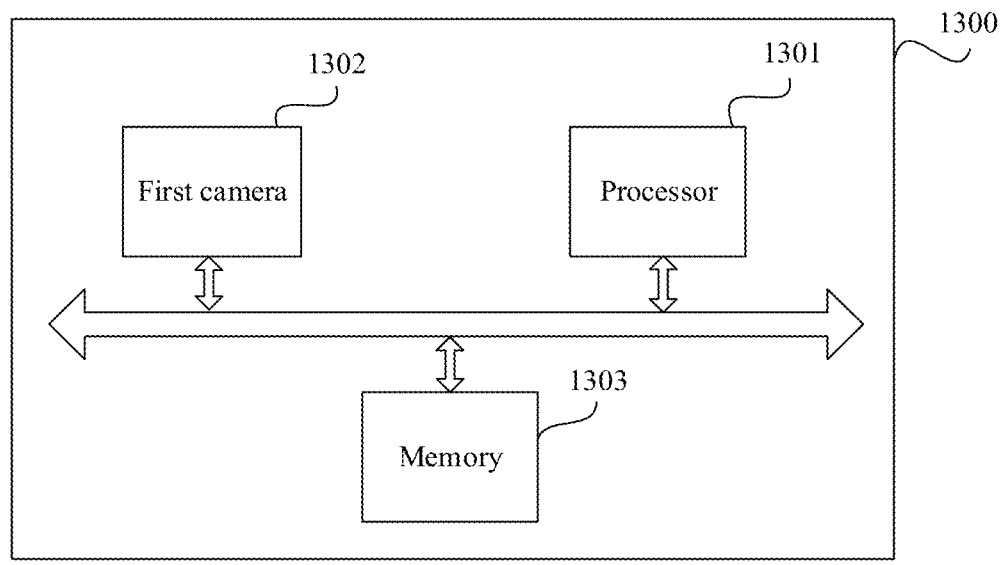
FIG. 13 is a schematic diagram depicting a structure of an imaging apparatus according to an embodiment.

Based on the foregoing content and the same concept, as shown in FIG. 13, this application further provides an imaging apparatus 1300. The imaging apparatus 1300 may include a processor 1301, a first camera 1302, and a memory 1303.

The memory 1303 is configured to store instructions or a program executed by the processor 1301, or store input data required for running the instructions or the program by the processor 1301, or store data generated after the processor 1301 runs the instructions or the program. The first camera 1302 includes an optical lens component, a ray adjustment component, and an image sensor. The optical lens component is configured to receive rays from a photographed object. The ray adjustment component is configured to fold an optical path of the rays propagated from the optical lens component. For more detailed descriptions of the first camera, refer to related descriptions of the first camera shown in FIG. 10. For more detailed descriptions of the compact camera module, refer to related descriptions of the compact camera modules shown in FIG. 3 to FIG. 9. Details are not described herein again.

When the imaging apparatus 1300 is configured to implement the method shown in FIG. 11, the processor 1301 is configured to perform functions of the obtaining module 1201, the determining module 1202, and the driving module 1203. For example, functions of the obtaining module 1201 may be implemented by the processor 1301 by invoking the program or the instructions stored in the memory 1303, to obtain a zoom ratio, and control the first camera 1302 to obtain a preview image when the zoom ratio is greater than a zoom ratio threshold. Functions of the determining module 1202 may be implemented by the processor 1301 by invoking the program or the instructions stored in the memory 1303, to determine a target focusing position of the first camera 1302 based on the preview image. Functions of the driving module 1203 may be implemented by the processor 1301 by invoking the program or the instructions stored in the memory 1303, to control the first actuator to drive the ray adjustment component to move for focusing.

In an embodiment, the terminal device may include the first camera, a second camera, and a third camera. The first camera and the second camera are fixed-focus cameras, and the third camera is a wide-angle camera. A magnification of the first camera is A1, a magnification of the second camera is A2, and a zoom ratio of the third camera is A3. A2 is greater than 1 and less than A1, and A3 is less than 1.

Further, optionally, the terminal device further includes a depth camera.

In an embodiment, a value range of A1 is [8, 12].

In an embodiment, the first camera includes a compact camera module. The compact camera module may include a first actuator, an optical lens component, a ray adjustment component, and an image sensor. The ray adjustment component and the image sensor are sequentially disposed along a direction of a principal optical axis of the optical lens component. The optical lens component is configured to receive rays from a photographed object. The ray adjustment component is configured to fold an optical path of the rays propagated from the optical lens component. The first actuator is configured to drive the ray adjustment component to move, so that the rays whose optical path is folded are focused on the image sensor. The image sensor is configured to perform imaging based on the focused rays. For more detailed descriptions of the compact camera module, refer to related descriptions of the compact camera modules shown in FIG. 3 to FIG. 9. Details are not described herein again.

It should be noted that, in any one of the foregoing embodiments, a zoom ratio used by a user during photographing and zoom ratios of cameras (for example, the first camera, the second camera, and the third camera) may alternatively be expressed in a form of "number+X". For example, a zoom ratio 0.8 may alternatively be expressed as 0.8×. For another example, a value range [8, 12] of A1 may alternatively be expressed as [8×, 12×].

It may be understood that, the processor in the embodiments of this application may be a central processing unit (CPU), or may be another general-purpose processor, a digital signal processor (DSP), an application-specific integrated circuit (ASIC), a field-programmable gate array (FPGA) or another programmable logic device, a transistor logic device, a hardware component, or any combination thereof. The general-purpose processor may be a microprocessor or any conventional processor.

The method operations in the embodiments of this application may be implemented in a hardware manner or may be implemented in a manner of executing software instructions by the processor. The software instructions may include corresponding software modules. The software modules may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a terminal device. Certainly, the processor and the storage medium may exist in the terminal device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid state drive (SSD).

In the embodiments of this application, unless otherwise stated or there is a logic conflict, terms and/or descriptions between different embodiments are consistent and may be mutually referenced, and technical features in different embodiments may be combined according to an internal logical relationship thereof, to form a new embodiment.

In this application, the term "and/or" describes an association relationship between associated objects and may indicate three relationships. For example, A and/or B may indicate the following cases: Only A exists, both A and B exist, and only B exists, where A and B may be singular or plural. In this application, "perpendicularity" may not mean absolute perpendicularity, and some engineering errors may be allowed. Some engineering errors are allowed for angles such as 30 degrees, 45 degrees, 60 degrees, 90 degrees, 120 degrees, 135 degrees, or 150 degrees. In this application, "(a, b)" indicates an open interval, indicating that a range is greater than a and less than b. "[a, b]" indicates a closed interval, indicating that a range is greater than or equal to a and less than or equal to b. "(a, b]" indicates a half-open and half-closed interval, indicating that a range is greater than a and less than or equal to b. "[a, b)" indicates a half-closed and half-open interval, indicating that a range is greater than or equal to a and less than b. In this application, a reflection surface is a surface that can reflect incident rays. A length $L_a$ of a first reflection surface a means that a length of the reflection surface a is $L_a$, and a width $K_a$ of the first reflection surface a means that a width of the reflection surface a is $K_a$.

It can be understood that numerals used in this application are differentiated merely for ease of description, but are not used to limit the scope of the embodiments of this application. The execution sequences of the processes should be determined according to functions and internal logic of the processes. The terms "first", "second", "third", "eleventh", "twelfth", and the like are used to distinguish between similar objects, and do not indicate a specific order or sequence. Moreover, the terms "include", "have", and any other variants thereof are intended to cover a non-exclusive inclusion, for example, including a series of operations or units. A method, system, product, or device does not need to be limited to those explicitly listed operations or units, but may include other operations or units that are not explicitly listed or that are inherent to the process, method, product, or device.

Although this application is described with reference to specific features and the embodiments thereof, it is clear that various modifications and combinations may be made to this application without departing from the spirit and scope of this application. Correspondingly, the specification and the accompanying drawings are merely example description of the solution defined by the appended claims, and are intended to cover any of or all modifications, variations, combinations or equivalents within the scope of this application.

What is claimed is:

1. A compact camera module, comprising:
   an image sensor;
   an optical lens component configured to receive rays from a photographed object;
   a ray adjustment component configured to fold an optical path of the rays propagated from the optical lens component;
   a first actuator configured to drive the ray adjustment component to move, so that the rays whose optical path is folded are focused on the image sensor,
   wherein the image sensor is configured to perform imaging based on the focused rays, and wherein the ray adjustment component and the image sensor are sequentially disposed along a direction of a principal optical axis of the optical lens component;
   wherein the ray adjustment component comprises:
   M first reflection surfaces sequentially connected, wherein an included angle $\theta_1$ between any two adjacent first reflection surfaces is greater than 0 degrees and less than 180 degrees; and
   M second reflection surfaces sequentially connected, wherein an included angle $\theta_2$ between any two adjacent second reflection surfaces is greater than 0 degrees and less than 180 degrees; and the M first reflection surfaces are disposed one-to-one opposite to the M second reflection surfaces, wherein M is an integer greater than or equal to 2,
   wherein a first reflection surface closest to the optical lens component is configured to receive and reflect the rays from the optical lens component, and a first reflection surface closest to the image sensor is configured to reflect, to the image sensor, the rays whose optical path is folded;
   wherein a first layered structure constituted by the M first reflection surfaces and a second layered structure constituted by the M second reflection surfaces do not overlap with each other; and
   wherein each first reflection surface or each second reflection surface is a reflection surface of a mirror or a prism.

2. The compact camera module according to claim 1, wherein an $i^{th}$ first reflection surface of the M first reflection surfaces is parallel to an $i^{th}$ second reflection surface of the M second reflection surfaces, and wherein the $i^{th}$ first reflection surface is disposed opposite to the $i^{th}$ second reflection surface.

3. The compact camera module according to claim 1, wherein the M first reflection surfaces comprise reflection surfaces of M/2 sequentially connected L-shaped mirrors, wherein any L-shaped mirror comprises two reflection surfaces; or the M first reflection surfaces comprise reflection surfaces of M sequentially connected mirrors; or the M first reflection surfaces comprise reflection surfaces of M/2 sequentially connected right-angle prisms; or the M first reflection surfaces comprise reflection surfaces of P mirrors and Q right-angle prisms that are sequentially connected, wherein any right-angle prism comprises two reflection surfaces, P+2Q=M, and both P and Q are positive integers.

4. The compact camera module according to claim 1, wherein the M second reflection surfaces comprise reflection surfaces of M/2 sequentially connected L-shaped mirrors, wherein any L-shaped mirror comprises two reflection surfaces; or the M second reflection surfaces comprise reflection surfaces of M sequentially connected mirrors; or the M second reflection surfaces comprise reflection surfaces of M/2 sequentially connected right-angle prisms; or the M second reflection surfaces comprise reflection surfaces of K mirrors and L right-angle prisms that are sequentially connected, wherein any right-angle prism comprises two reflection surfaces, K+2L=M, and both K and L are positive integers.

5. The compact camera module according to claim 1, wherein when M=2, the two first reflection surfaces are two mutually perpendicular reflection surfaces of one L-shaped mirror, and the two second reflection surfaces are two mutually perpendicular reflection surfaces of one right-angle prism.

6. The compact camera module according to claim 1, wherein the first actuator is configured to:
   drive the M first reflection surfaces to move along a first direction, and/or drive the M second reflection surfaces to move along a second direction, wherein the first direction is opposite to the second direction, and both the first direction and the second direction are directions perpendicular to the principal optical axis; or,
   drive the M first reflection surfaces to move along a direction perpendicular to the principal optical axis.

7. The compact camera module according to claim 1, wherein the first actuator is further configured to:
   drive the M first reflection surfaces and/or the M second reflection surfaces to move along a third direction, to perform optical image stabilization on the rays from the optical lens component, wherein the third direction is a direction parallel to the principal optical axis.

8. The compact camera module according to claim 1, wherein the ray adjustment component comprises:
   an L-shaped mirror having an eleventh reflection surface and a twelfth reflection surface that are perpendicular to each other; and
   a right-angle prism having a thirteenth reflection surface and a fourteenth reflection surface that are perpendicular to each other, wherein the eleventh reflection surface and the thirteenth reflection surface are disposed opposite and parallel to each other; and the twelfth reflection surface and the fourteenth reflection surface are disposed opposite and parallel to each other; and
   wherein the rays from the optical lens component are reflected to the image sensor after being sequentially reflected by the eleventh reflection surface, the thirteenth reflection surface, the fourteenth reflection surface, and the twelfth reflection surface.

9. The compact camera module according to claim 8, wherein when the rays from the optical lens component enter the eleventh reflection surface of the L-shaped mirror at an incident angle of 45 degrees, the rays reflected to the image sensor by the twelfth reflection surface of the L-shaped mirror are parallel to the direction of the principal optical axis.

10. A terminal device, comprising:
a first camera having a compact camera module,
a memory configured to store a program or instructions, and
a processor is configured to invoke the program or the instructions to control the first camera to obtain a first image; wherein
the compact camera module comprises:
an image sensor;
an optical lens component configured to receive rays from a photographed object;
a ray adjustment component configured to fold an optical path of the rays propagated from the optical lens component;
a first actuator configured to drive the ray adjustment component to move, so that the rays whose optical path is folded are focused on the image sensor,
wherein the image sensor is configured to perform imaging based on the focused rays, and
wherein the ray adjustment component and the image sensor are sequentially disposed along a direction of a principal optical axis of the optical lens component,
wherein the ray adjustment component comprises:
M first reflection surfaces sequentially connected, wherein an included angle $\theta_1$ between any two adjacent first reflection surfaces is greater than 0 degrees and less than 180 degrees; and
M second reflection surfaces sequentially connected, wherein an included angle $\theta_2$ between any two adjacent second reflection surfaces is greater than 0 degrees and less than 180 degrees; and
the M first reflection surfaces are disposed one-to-one opposite to the M second reflection surfaces, wherein M is an integer greater than or equal to 2,
wherein a first reflection surface closest to the optical lens component is configured to receive and reflect the rays from the optical lens component, and a first reflection surface closest to the image sensor is configured to reflect, to the image sensor, the rays whose optical path is folded;
wherein a first layered structure constituted by the M first reflection surfaces and a second layered structure constituted by the M second reflection surfaces do not overlap with each other; and
wherein each first reflection surface or each second reflection surface is a reflection surface of a mirror or a prism.

11. The terminal device according to claim 10, wherein the M first reflection surfaces comprise reflection surfaces of M/2 sequentially connected L-shaped mirrors, wherein any L-shaped mirror comprises two reflection surfaces; or the M first reflection surfaces comprise reflection surfaces of M sequentially connected mirrors; or the M first reflection surfaces comprise reflection surfaces of M/2 sequentially connected right-angle prisms; or the M first reflection surfaces comprise reflection surfaces of P mirrors and Q right-angle prisms that are sequentially connected, wherein any right-angle prism comprises two reflection surfaces, P+2Q=M, and both P and Q are positive integers.

12. The terminal device according to claim 10, wherein the M second reflection surfaces comprise reflection surfaces of M/2 sequentially connected L-shaped mirrors, wherein any L-shaped mirror comprises two reflection surfaces; or the M second reflection surfaces comprise reflection surfaces of M sequentially connected mirrors; or the M second reflection surfaces comprise reflection surfaces of M/2 sequentially connected right-angle prisms; or the M second reflection surfaces comprise reflection surfaces of K mirrors and L right-angle prisms that are sequentially connected, wherein any right-angle prism comprises two reflection surfaces, K+2L=M, and both K and L are positive integers.

13. The terminal device according to claim 10, wherein when M=2, the two first reflection surfaces are two mutually perpendicular reflection surfaces of one L-shaped mirror, and the two second reflection surfaces are two mutually perpendicular reflection surfaces of one right-angle prism.

14. The terminal device according to claim 10, wherein the first actuator is configured to:
drive the M first reflection surfaces to move along a first direction, and/or drive the M second reflection surfaces to move along a second direction, wherein
the first direction is opposite to the second direction, and both the first direction and the second direction are directions perpendicular to the principal optical axis; or,
drive the M first reflection surfaces to move along a direction perpendicular to the principal optical axis.

15. The terminal device according to claim 10, wherein the first actuator is further configured to:
drive the M first reflection surfaces and/or the M second reflection surfaces to move along a third direction, to perform optical image stabilization on the rays from the optical lens component, wherein the third direction is a direction parallel to the principal optical axis.

16. The terminal device according to claim 10, wherein the ray adjustment component comprises:
an L-shaped mirror having an eleventh reflection surface and a twelfth reflection surface that are perpendicular to each other; and
a right-angle prism having a thirteenth reflection surface and a fourteenth reflection surface that are perpendicular to each other, wherein the eleventh reflection surface and the thirteenth reflection surface are disposed opposite and parallel to each other; and the twelfth reflection surface and the fourteenth reflection surface are disposed opposite and parallel to each other; and
wherein the rays from the optical lens component are reflected to the image sensor after being sequentially reflected by the eleventh reflection surface, the thirteenth reflection surface, the fourteenth reflection surface, and the twelfth reflection surface.

17. The terminal device according to claim 10, wherein the terminal device further comprises a wide-angle camera.

18. The terminal device according to claim 10, wherein the first camera is a fixed-focus camera, a magnification of the first camera is A1, and a value range of A1 is [8, 12].

19. The terminal device according to claim 10, wherein the terminal device further comprises a second camera, the second camera is a fixed-focus camera, a magnification of the second camera is A2, and A2 is greater than 1 and less than A1.

* * * * *